(12) United States Patent
Hiasa et al.

(10) Patent No.: US 11,577,715 B2
(45) Date of Patent: Feb. 14, 2023

(54) HYBRID VEHICLE

(71) Applicant: TOYOTA JIDOSHA KABUSHIKI KAISHA, Toyota (JP)

(72) Inventors: Yasuhiro Hiasa, Toyota (JP); Takahiro Kimura, Toyota (JP); Yasutaka Tsuchida, Toyota (JP); Shinichi Sasade, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 185 days.

(21) Appl. No.: 16/991,249

(22) Filed: Aug. 12, 2020

(65) Prior Publication Data

US 2021/0061252 A1 Mar. 4, 2021

(30) Foreign Application Priority Data

Aug. 29, 2019 (JP) .............................. JP2019-157045

(51) Int. Cl.
*B60W 20/10* (2016.01)
*B60W 20/30* (2016.01)
(Continued)

(52) U.S. Cl.
CPC ............ *B60W 20/10* (2013.01); *B60W 10/06* (2013.01); *B60W 10/08* (2013.01); *B60W 10/115* (2013.01); *B60W 10/26* (2013.01); *B60W 20/30* (2013.01); *B60W 30/188* (2013.01); *B60W 2510/0638* (2013.01); *B60W 2510/1005* (2013.01); *B60W 2510/244* (2013.01); *B60W 2520/10* (2013.01); *B60W 2540/10* (2013.01);
(Continued)

(58) Field of Classification Search
CPC ...... B60W 20/10; B60W 10/06; B60W 10/08; B60W 10/115; B60W 10/26; B60W 20/30; B60W 30/188; B60W 2510/0638; B60W 2510/1005; B60W 2510/244; B60W 2520/10; B60W 2540/10; B60W 2552/15; B60W 2710/0644; B60W 2710/0677; B60W 2710/1005; B60W 2710/086; B60W 10/11
USPC .......................................................... 477/3
See application file for complete search history.

(56) References Cited

U.S. PATENT DOCUMENTS 6,131,680 A    10/2000 Nii et al.
11,267,456 B2 * 3/2022 Kohno .................. B60K 6/445
(Continued)

FOREIGN PATENT DOCUMENTS

JP      9-308012 A     11/1997
JP   2013-216205 A    10/2013
(Continued)

OTHER PUBLICATIONS

Jul. 25, 2022 Office Action issued in U.S. Appl. No. 16/991,170.
(Continued)

*Primary Examiner* — Roger L Pang
(74) *Attorney, Agent, or Firm* — Oliff PLC

(57) ABSTRACT

When a first type gear shift line is used as a gear shift line to change the gear ratio, and a predetermined condition including a condition that a state of charge of the power storage device is equal to or lower than a first ratio is satisfied, the control device changes the gear shift line to a second type gear shift line that recommends a lower speed gear ratio than the first type gear shift line.

12 Claims, 16 Drawing Sheets

(51) Int. Cl.
*B60W 30/188* (2012.01)
*B60W 10/26* (2006.01)
*B60W 10/08* (2006.01)
*B60W 10/06* (2006.01)
*B60W 10/115* (2012.01)

(52) U.S. Cl.
CPC . *B60W 2552/15* (2020.02); *B60W 2710/0644* (2013.01); *B60W 2710/0677* (2013.01); *B60W 2710/086* (2013.01); *B60W 2710/1005* (2013.01)

(56) References Cited

U.S. PATENT DOCUMENTS

| | | | |
|---|---|---|---|
| 2014/0081499 A1* | 3/2014 | Ito | B60W 10/26 180/65.265 |
| 2014/0081500 A1 | 3/2014 | Ito et al. | |
| 2014/0180517 A1* | 6/2014 | Endo | B60K 6/445 180/65.265 |
| 2014/0330475 A1* | 11/2014 | Shibata | B60K 6/445 180/65.265 |
| 2017/0088164 A1 | 3/2017 | Kobayashi | |
| 2017/0259802 A1 | 9/2017 | Kato et al. | |
| 2017/0334433 A1 | 11/2017 | Kato et al. | |
| 2021/0061251 A1* | 3/2021 | Kimura | B60W 20/10 |
| 2021/0061259 A1 | 3/2021 | Kohno et al. | |

FOREIGN PATENT DOCUMENTS

| | | |
|---|---|---|
| JP | 2017-52496 A | 3/2017 |
| JP | 2017-159732 A | 9/2017 |
| JP | 2017-206106 A | 11/2017 |
| JP | 2017-208108 A | 11/2017 |
| JP | 2019131137 A * | 8/2019 |

OTHER PUBLICATIONS

Oct. 19, 2022 Notice of Allowance issued in U.S. Appl. No. 16/991,170.

Nov. 14, 2022 Corrected Notice of Allowabilty issued in U.S. Appl. No. 16/991,170.

* cited by examiner

|      | C1 | C2 | B1 | B2 | B3 |
|------|----|----|----|----|----|
| 1st  | O  | –  | –  | –  | O  |
| 2nd  | O  | –  | –  | O  | –  |
| 3rd  | O  | –  | O  | –  | –  |
| 4th  | O  | O  | –  | –  | –  |
| R    | –  | O  | –  | –  | O  |
| N    | –  | –  | –  | –  | –  |

"O": ENGAGE, "–": DISENGAGE

FIG. 3

(A) FIRST TYPE GEAR SHIFT LINE (B) SECOND TYPE GEAR SHIFT LINE

HYBRID VEHICLE

CROSS-REFERENCE TO RELATED APPLICATIONS

The present disclosure claims priority to Japanese Patent Application No. 2019-157045 filed Aug. 29, 2019, which is incorporated herein by reference in its entirety including specification, drawings and claims.

TECHNICAL FIELD

The present disclosure relates to a hybrid vehicle.

BACKGROUND

In a proposed configuration of a hybrid vehicle, a planetary gear has a sun gear connected with a first motor, a carrier connected with an engine, and a ring gear connected with a second motor and with a driveshaft that is linked with an axle, and a battery is connected with the first motor and with the second motor via power lines (as described in, for example, JP 2017-159732A). This hybrid vehicle sets a required driving force that is required for the driveshaft, based on an accelerator position and a vehicle speed, and also sets a gear ratio based on the accelerator position and the vehicle speed. This hybrid vehicle sets a drivability rotation speed of the engine, based on the vehicle speed and the gear ratio. This hybrid vehicle sets an upper limit power of the engine when the engine is operated at the drivability rotation speed. This hybrid vehicle sets an upper limit driving force of the driveshaft when the upper limit power is output from the engine. This hybrid vehicle controls the engine, the first motor and the second motor such that the engine is operated at the drivability rotation speed and the smaller between the required driving force and the upper limit driving force is output to the driveshaft. In this hybrid vehicle, such control causes the rotation speed of the engine to be a rotation speed according to the vehicle speed even when the driver steps on an accelerator pedal. This hybrid vehicle gives the driver the better drive feeling, compared with a configuration abruptly increases the rotation speed of the engine prior to an increase in the vehicle speed. In this hybrid vehicle, the rotation speed of the engine varies with a change in the gear ratio. This hybrid vehicle accordingly gives the driver the feeling of speed change.

SUMMARY

In the hybrid vehicle described above, it is possible to increase a torque output from the second motor to the drive shaft by using electric power of the battery in order to output larger driving force than the upper limit driving force to the drive shaft when the required driving force becomes larger than the upper limit driving force. Such control may further decrease a state of charge of the battery and cause over discharge when the state of charge of the battery is low.

A main object of a hybrid vehicle of the present disclosure is to suppress over discharge of the battery.

In order to achieve the above main object, the hybrid vehicle of the present disclosure employs the following configuration.

The present disclosure is directed to a hybrid vehicle. The hybrid vehicle includes an engine, a first motor, a planetary gear including three rotational elements that are respectively connected with the engine, the first motor and a driveshaft which is linked with an axle, a second motor configured to input and output power from and to the driveshaft, a power storage device configured to transmit electric power to and from the first motor and the second motor, and a control device. The control device is programmed to set a required driving force that is required for the driveshaft, based on an operation amount of an accelerator and a vehicle speed, set a gear ratio, based on the operation amount of the accelerator and the vehicle speed, set a target rotation speed of the engine, based on the vehicle speed and the gear ratio, set an upper limit power of the engine when the engine is driven at the target rotation speed, set a first upper limit driving force of the driveshaft when the upper limit power is output from the engine, set a target driving force of the driveshaft, based on a magnitude relationship between the required driving force and the first upper limit driving force, and control the engine, the first motor and the second motor, such that the engine is driven at the target rotation speed and that the hybrid vehicle is driven with the target driving force. When the required driving force is equal to or smaller than the first upper limit driving force, the control device is programmed to set the target driving force to the required driving force, and when the required driving force is larger than the first upper limit driving force, the control device is programmed to set a target compensation power of the power storage device, based on a difference between the required driving force and the first upper limit driving force, the control device is programmed to set a second upper limit driving force of the driveshaft when the upper limit power is output from the engine and power storage device power compensation is performed to charge or discharge the power storage device based on a power corresponding to the target compensation power, and the control device is programmed to set the target driving force to the smaller between the required driving force and the second upper limit driving force. When a first type gear shift line is used as a gear shift line to change the gear ratio, and a predetermined condition including a condition that a state of charge of the power storage device is equal to or lower than a first ratio is satisfied, the control device is programmed to change the gear shift line to a second type gear shift line that recommends a lower speed gear ratio than the first type gear shift line.

In the hybrid vehicle according to this aspect of the present disclosure, when the required driving force is equal to or smaller than the first upper limit driving force, the control device sets the target driving force to the required driving force. When the required driving force is larger than the first upper limit driving force, the control device sets the target compensation power of the power storage device, based on the difference between the required driving force and the first upper limit driving force. The control device sets the second upper limit driving force of the driveshaft when the upper limit power is output from the engine and power storage device power compensation is performed to charge or discharge the power storage device based on the power corresponding to the target compensation power. The control device sets the target driving force to the smaller between the required driving force and the second upper limit driving force. Further, when the first type gear shift line is used as the gear shift line to change the gear ratio, and the predetermined condition including the condition that the state of charge of the power storage device is equal to or lower than the first ratio is satisfied, the control device changes the gear shift line to the second type gearshift line that recommends the lower speed gear ratio than the first type gear shift line. When the second type gear shift line is used as the gear shift line, the target rotation speed of the engine, the upper limit power of the engine, and the first upper limit driving force are likely to be larger compared to when the first type gear shift line is used. Accordingly, the hybrid vehicle of the present disclosure suppresses the required driving force from being larger than the first upper limit driving force and also suppresses the power storage device power compensation from being performed. As a result, the hybrid vehicle of the present disclosure suppresses the state of charge from being decreased and also suppresses over discharge of the battery. Here, "the second type gearshift line that recommends the lower speed gear ratio than the first type gear shift line" means the second type gear shift line in which at least apart of the first type gearshift line is moved to a high-speed side or a low-accelerator position side with respect to the first type gear shift line.

BRIEF DESCRIPTION OF DRAWINGS

FIG. 3 is an operation table showing a relationship between the respective speeds of the stepped transmission and the states of clutches C1 and C2 and brakes B1, B2 and B3;

DESCRIPTION OF EMBODIMENTS

The following describes some aspects of the disclosure with reference to embodiments.

Figure 1:
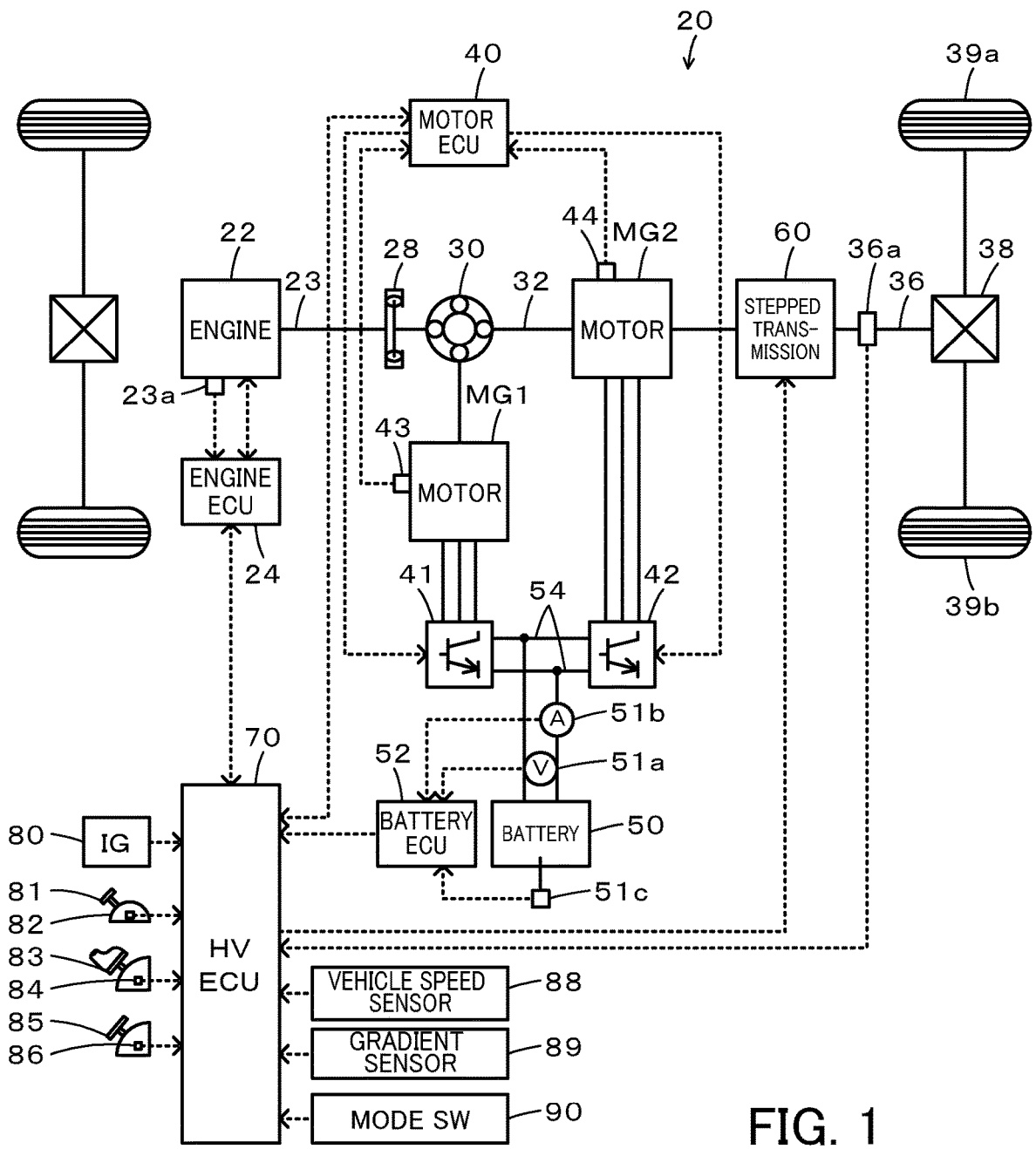
FIG. 1 is a configuration diagram illustrating the schematic configuration of a hybrid vehicle according to one embodiment of the present disclosure.
Figure 2:
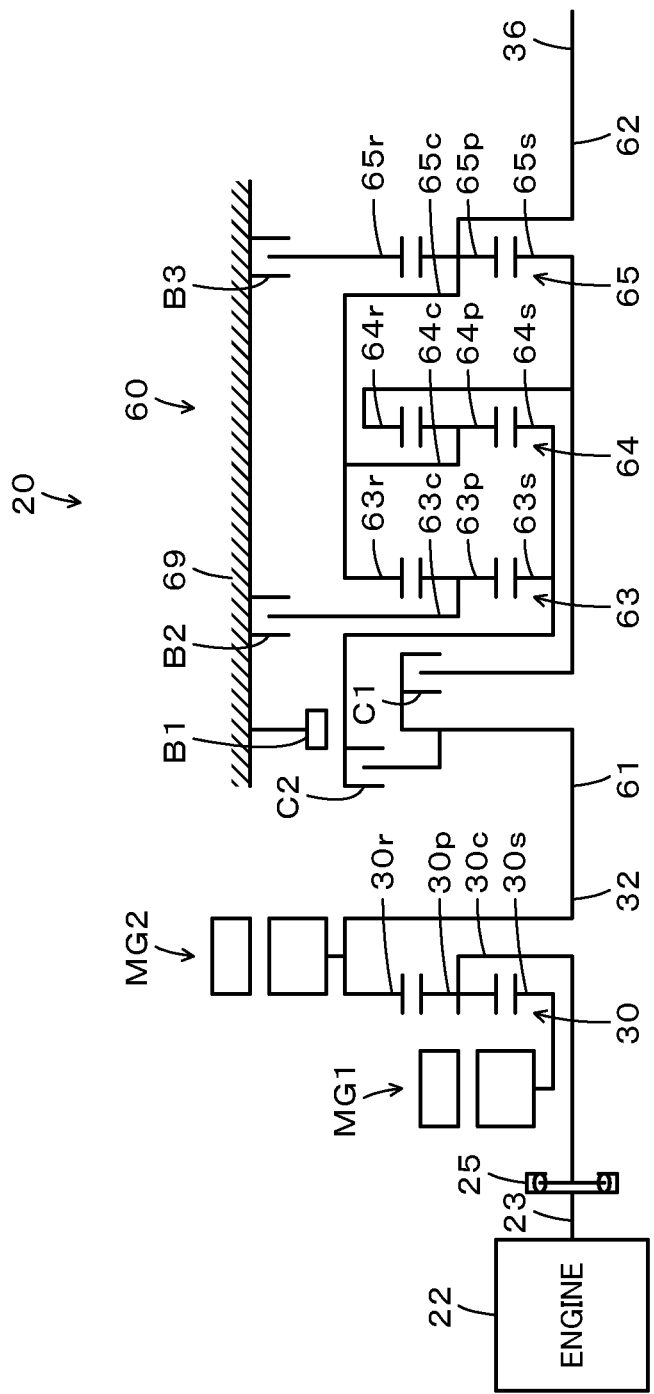
FIG. 2 is a configuration diagram illustrating the schematic configuration of an engine, a planetary gear, motors MG1 and MG2 and a stepped transmission.

FIG. 1 is a configuration diagram illustrating the schematic configuration of a hybrid vehicle 20 according to one embodiment of the present disclosure. FIG. 2 is a configuration diagram illustrating the schematic configuration of an engine 22, a planetary gear 30, motors MG1 and MG2 and a stepped transmission 60. As illustrated in FIGS. 1 and 2, the hybrid vehicle 20 of the embodiment includes an engine 22, a planetary gear 30, motors MG1 and MG2, inverters 41 and 42, a battery 50 serving as a power storage device, a stepped transmission 60, and a hybrid electronic control unit (hereinafter referred to as "HVECU") 70.

The engine 22 is configured as an internal combustion engine to output power by using, for example, gasoline or light oil as a fuel. This engine 22 is operated and controlled by an engine electronic control unit (hereinafter referred to as "engine ECU") 24.

The engine ECU 24 includes a microcomputer including a CPU, a ROM, a RAM, input/output ports, and a communication port. Signals from various sensors required for operating and controlling the engine 22 are input into the engine ECU 24 via the input port. The signals input into the engine ECU 24 include, for example, a crank angle θcr of a crankshaft 23 from a crank position sensor 23a configured to detect the rotational position of the crankshaft 23 of the engine 22. The engine ECU outputs various control signals for operating and controlling the engine 22 via the output port. The engine ECU 24 is connected with the HVECU 70 via respective communication ports. The engine ECU 24 calculates a rotation speed Ne of the engine 22, based on the crank angle θcr input from the crank position sensor 23a.

The planetary gear 30 is configured as a single pinion-type planetary gear mechanism. This planetary gear 30 includes a sun gear 30s as an external gear, a ring gear 30r as an internal gear, a plurality of pinion gears 30p respectively engaged with the sun gear 30s and the ring gear 30r, and a carrier 30c provided to support the plurality of pinion gears 30p to be rotatable on their axes and revolvable. The sun gear 30s is connected with a rotor of the motor MG1. The ring gear 30r is connected with a rotor of the motor MG2 and with an input shaft 61 of the stepped transmission 60 via a transmission member 32. The carrier 30c is connected with the crankshaft 23 of the engine 22 via a damper 28.

Both the motors MG1 and MG2 are configured, for example, as synchronous generator motors. The rotor of the motor MG1 is connected with the sun gear 30s of the planetary gear 30 as described above. The rotor of the motor MG2 is connected with the ring gear 30r of the planetary gear 30 and with the input shaft 61 of the stepped transmission 60 via the transmission member 32 as described above. The inverters 41 and 42 are used to drive the motors MG1 and MG2 and are connected with the battery 50 via power lines 54. A motor electronic control unit (hereinafter referred to as "motor ECU") 40 performs switching control of a plurality of switching elements (not shown) included in the inverters 41 and 42, so as to rotate and drive the motors MG1 and MG2.

The motor ECU 40 includes a microcomputer including a CPU, a ROM, a RAM, input/output ports, and a communication port. Signals from various sensors required for driving and controlling the motors MG1 and MG2 are input into the motor ECU 40 via the input port. The signals input into the motor ECU 40 include, for example, rotational positions $\theta m1$ and $\theta m2$ of the respective rotors of the motor MG1 and MG2 from rotational position sensors 43 and 44 configured to detect the rotational positions of the respective rotors of the motors MG1 and MG2 and phase currents $Iu1$, $Iv1$, $Iu2$ and $Iv2$ of respective phases of the motors MG1 and MG2 from current sensors configured to detect the phase currents flowing in the respective phases of the motors MG1 and MG2. The motor ECU 40 outputs, for example, switching control signals to the plurality of switching elements (not shown) included in the inverters 41 and 42 via the output port. The motor ECU 40 is connected with the HVECU 70 via the respective communication ports. The motor ECU 40 calculates electrical angles $\theta e1$ and $\theta e2$ and rotation speeds $Nm1$ and $Nm2$ of the motors MG1 and MG2, based on the rotational positions $\theta m1$ and $\theta m2$ of the respective rotors of the motor MG1 and MG2 input from the rotational position sensors 43 and 44.

The battery 50 is configured as, for example, a lithium ion rechargeable battery or a nickel metal hydride battery. This battery 50 is connected with the inverters 41 and 42 via the power lines 54 as described above. The battery 50 is under management of a battery electronic control unit (hereinafter referred to as "battery ECU") 52.

The battery ECU 52 includes a microcomputer including a CPU, a ROM, a RAM, input/output ports, and a communication port. Signals from various sensors required for management of the battery 50 are input into the battery ECU 52 via the input port. The signals input into the battery ECU 52 include, for example, a voltage Vb of the battery 50 from a voltage sensor 51a placed between terminals of the battery 50, an electric current Ib of the battery 50 from a current sensor 51b mounted to an output terminal of the battery 50, and a temperature Tb of the battery 50 from a temperature sensor 51c mounted to the battery 50. The battery ECU 52 is connected with the HVECU 70 via the respective communication ports. The battery ECU 52 calculates a state of charge SOC of the battery 50, based on an integrated value of the electric current Ib of the battery 50 input from the current sensor 51b. The state of charge SOC denotes a ratio of the capacity of electric power dischargeable from the battery 50 to the total capacity of the battery 50. The battery ECU 52 also calculates an input limit Win and an output limit Wout of the battery 50, based on the state of charge SOC of the battery 50 and the temperature Tb of the battery 50 input from the temperature sensor 51c. The input limit Win denotes a maximum allowable power (negative value) to charge the battery 50. The output limit Wout denotes a maximum allowable power (positive value) to be discharged from the battery 50.

The stepped transmission 60 is configured as a four-speed stepped transmission. This stepped transmission 60 includes the input shaft 61, an output shaft 62, planetary gears 63, 64 and 65, clutches C1 and C2, and brakes B1, B2 and B3. The input shaft 61 is connected with the ring gear 30r of the planetary gear 30 and with the motor MG2 via the transmission member 32 as described above. The output shaft 62 is connected with a driveshaft 36 that is linked with drive wheels 39a and 39b via a differential gear 38.

The planetary gear 63 is configured as a single pinion-type planetary gear mechanism. This planetary gear 63 includes a sun gear 63s as an external gear, a ring gear 63r as an internal gear, a plurality of pinion gears 63p respectively engaged with the sun gear 63s and the ring gear 63r, and a carrier 63c provided to support the plurality of pinion gears 63p to be rotatable on their axes and revolvable.

The planetary gear 64 is configured as a single pinion-type planetary gear mechanism. This planetary gear 64 includes a sun gear 64s as an external gear, a ring gear 64r as an internal gear, a plurality of pinion gears 64p respectively engaged with the sun gear 64s and the ring gear 64r, and a carrier 64c provided to support the plurality of pinion gears 64p to be rotatable on their axes and revolvable.

The planetary gear 65 is configured as a single pinion-type planetary gear mechanism. This planetary gear 65 includes a sun gear 65s as an external gear, a ring gear 65r as an internal gear, a plurality of pinion gears 65p respectively engaged with the sun gear 65s and the ring gear 65r, and a carrier 65c provided to support the plurality of pinion gears 65p to be rotatable on their axes and revolvable.

The sun gear 63s of the planetary gear 63 and the sun gear 64s of the planetary gear 64 are linked with (fixed to) each other. The ring gear 63r of the planetary gear 63, the carrier 64c of the planetary gear 64 and the carrier 65c of the planetary gear 65 are linked with one another. The ring gear 64r of the planetary gear 64 and the sun gear 65s of the planetary gear 65 are linked with each other. Accordingly, the planetary gears 63, 64 and 65 serve as five element-type mechanism using the sun gear 63s of the planetary gear 63 with the sun gear 64s of the planetary gear 64; the carrier 63c of the planetary gear 63; the ring gear 65r of the planetary gear 65; the ring gear 63r of the planetary gear 63 with the carrier 64c of the planetary gear 64 and the carrier 65c of the planetary gear 65; and the ring gear 64r of the planetary gear 64 with the sun gear 65s of the planetary gear 65, as five rotational elements. The ring gear 63r of the planetary gear 63, the carrier 64c of the planetary gear 64 and the carrier 65c of the planetary gear 65 are linked with the output shaft 62.

The clutch C1 is configured to connect and disconnect the input shaft 61 with and from the ring gear 64r of the planetary gear 64 and the sun gear 65s of the planetary gear 65. The clutch C2 is configured to connect and disconnect the input shaft 61 with and from the sun gear 63s of the planetary gear 63 and the sun gear 64s of the planetary gear 64.

The brake B1 is configured to fix (connect) the sun gear 63s of the planetary gear 63 and the sun gear 64s of the planetary gear 64 to (with) a transmission case 69 such as to be not rotatable and to release the sun gear 63s and the sun gear 64s from the transmission case 69 such as to be rotatable. The brake B2 is configured to fix (connect) the carrier 63c of the planetary gear 63 to and from the transmission case 69 such as to be not rotatable and to release the carrier 63c from the transmission case 69 such as to be rotatable. The brake B3 is configured to fix (connect) the ring gear 65r of the planetary gear 65 to (with) the transmission case 69 such as to be not rotatable and to release the ring gear 65r from the transmission case 69 such as to be rotatable.

The clutches C1 and C2 are respectively configured as, for example, hydraulically actuated multiple disc clutches. The brake B1 is configured as, for example, a hydraulically actuated band brake. The brakes B2 and B3 are respectively configured as, for example, hydraulically actuated multiple disc brakes. The clutches C1 and C2 and the brakes B1, B2 and B3 are operated through supply and discharge of hydraulic oil by a hydraulic controller (not shown). The hydraulic controller is controlled by the HVECU 70.

Figure 4:
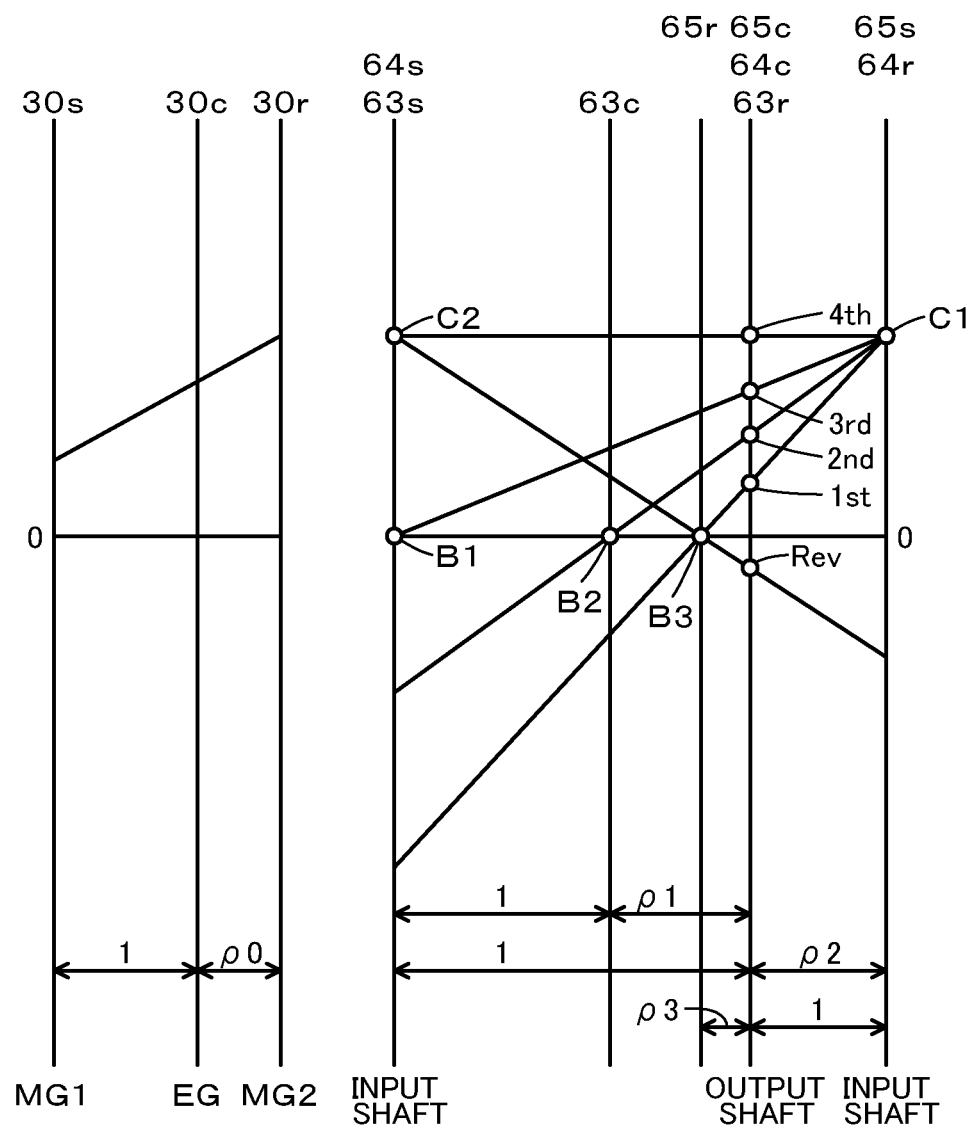
FIG. 4 is alignment charts showing a relationship among the rotation speeds of respective rotational elements of the planetary gear and a relationship among the rotation speeds of respective rotational elements of the stepped transmission.

FIG. 3 is an operation table showing a relationship between the respective speeds of the stepped transmission 60 and the states of the clutches C1 and C2 and the brakes B1, B2 and B3. FIG. 4 is alignment charts showing a relationship among the rotation speeds of the respective rotational elements of the planetary gear 30 and a relationship among the rotation speeds of the respective rotational elements of the stepped transmission 60. In the charts of FIG. 4, "ρ0" denotes a gear ratio of the planetary gear 30 (the number of teeth of the sun gear 30s/the number of teeth of the ring gear 30r), "ρ1" denotes a gear ratio of the planetary gear 63 (the number of teeth of the sun gear 63s/the number of teeth of the ring gear 63r), "ρ2" denotes a gear ratio of the planetary gear 64 (the number of teeth of the sun gear 64s/the number of teeth of the ring gear 64r), and "ρ3" denotes a gear ratio of the planetary gear 65 (the number of teeth of the sun gear 65s/the number of teeth of the ring gear 65r).

In FIG. 4, the left side is the alignment chart of the planetary gear 30, and the right side is the alignment chart of the stepped transmission 60. In the alignment chart of the planetary gear 30, a 30s axis indicates a rotation speed of the sun gear 30s that is equal to a rotation speed Nm1 of the motor MG1. A 30c axis indicates a rotation speed of the carrier 30c that is equal to a rotation speed Ne of the engine 22. A 30r axis indicates a rotation speed of the ring gear 30r that is equal to a rotation speed Nm2 of the motor MG2, a rotation speed of the transmission member 32, and a rotation speed of the input shaft 61. In the alignment chart of the stepped transmission 60, a 63s-64s axis indicates rotation speeds of the sun gear 63s of the planetary gear 63 and of the sun gear 64s of the planetary gear 64. A 63c axis indicates a rotation speed of the carrier 63c of the planetary gear 63. A 65r axis indicates a rotation speed of the ring gear 65r of the planetary gear 65. A 63r-64c-65c axis indicates rotation speeds of the ring gear 63r of the planetary gear 63, of the carrier 64c of the planetary gear 64 and of the carrier 65c of the planetary gear 65 that are equal to a rotation speed Nd of the driveshaft 36 (i.e., a rotation speed of the output shaft 62). A 64r-65s axis indicates rotation speeds of the ring gear 64r of the planetary gear 64 and of the sun gear 65s of the planetary gear 65.

In the stepped transmission 60, the clutches C1 and C2 and the brakes B1, B2 and B3 are engaged and disengaged to provide forward gear ratios of a first speed to a fourth speed and a reverse gear ratio as shown in FIG. 3. More specifically, the forward gear ratio of the first speed is provided by engaging the clutch C1 and the brake B3 and disengaging the clutch C2 and the brakes B1 and B2. The forward gear ratio of the second speed is provided by engaging the clutch C1 and the brake B2 and disengaging the clutch C2 and the brakes B1 and B3. The forward gear ratio of the third speed is provided by engaging the clutch C1 and the brake B1 and disengaging the clutch C2 and the brakes B2 and B3. The forward gear ratio of the fourth speed is provided by engaging the clutches C1 and C2 and disengaging the brakes B1, B2 and B3. The reverse gear ratio is provided by engaging the clutch C2 and the brake B3 and disengaging the clutch C1 and the brakes B1 and B2.

The HVECU 70 includes a microcomputer including a CPU, a ROM, a RAM, input/output ports, and a communication port. Signals from various sensors are input into the HVECU 70 via the input port. The signals input into the HVECU 70 include, for example, a rotation speed Nd of the driveshaft 36 from a rotation speed sensor 36a configured to detect the rotation speed of the driveshaft 36, an ignition signal from an ignition switch 80 and a shift position SP from a shift position sensor 82 configured to detect an operating position of a shift lever 81. The signals input into the HVECU 70 also include an accelerator position Acc from an accelerator pedal position sensor 84 configured to detect a depression amount of an accelerator pedal 83 and a brake pedal position BP from a brake pedal position sensor 86 configured to detect a depression amount of a brake pedal 85. The signals input into the HVECU 70 further include a vehicle speed V from a vehicle speed sensor 88, a road surface gradient θrd from a gradient sensor 89 (which has a positive value in the case of an uphill road), and a mode signal from a mode switch 90. The HVECU 70 outputs various control signals via the output port. The signals output from the HVECU 70 include, for example, a control signal to the stepped transmission 60 (hydraulic controller). The HVECU 70 is connected with the engine ECU 24, the motor ECU 40 and the battery ECU 52 via the respective communication ports as described above.

The shift position SP herein includes a parking position (P position), a reverse position (R position), a neutral position (N position) and a drive position (D position).

The mode switch 90 serves as a switch operated by the driver to select a working drive mode out of a plurality of drive modes including an ordinary mode that gives priority to the fuel consumption and a drivability priority mode that gives priority to the driver's drive feeling (drivability) over the fuel consumption. When the ordinary mode is selected as the working drive mode, the engine 22 and the motors MG1 and MG2 are driven and controlled, such that the hybrid vehicle 20 is driven with efficiently operating the engine 22 at the shift position SP set to the D position. When the drivability priority mode is selected as the working drive mode, on the other hand, the engine 22 and the motors MG1 and MG2 are driven and controlled, such that the hybrid vehicle 20 is driven with operating the engine 22 as if the engine 22 is connected with the driveshaft 36 via a virtual 10-speed stepped transmission (hereinafter referred to as "simulated transmission") at the shift position SP set to the D position. The respective gear ratios of the ten-speed simulated transmission are configured such that two virtual gear ratios are provided with regard to each of the gear ratios of the first to the third speeds of the four-speed stepped transmission 60.

The hybrid vehicle 20 of the embodiment including the configuration described above is driven by hybrid drive (HV drive) with operation of the engine 22 or by electric drive (EV drive) without operation of the engine 22.

Figure 5:
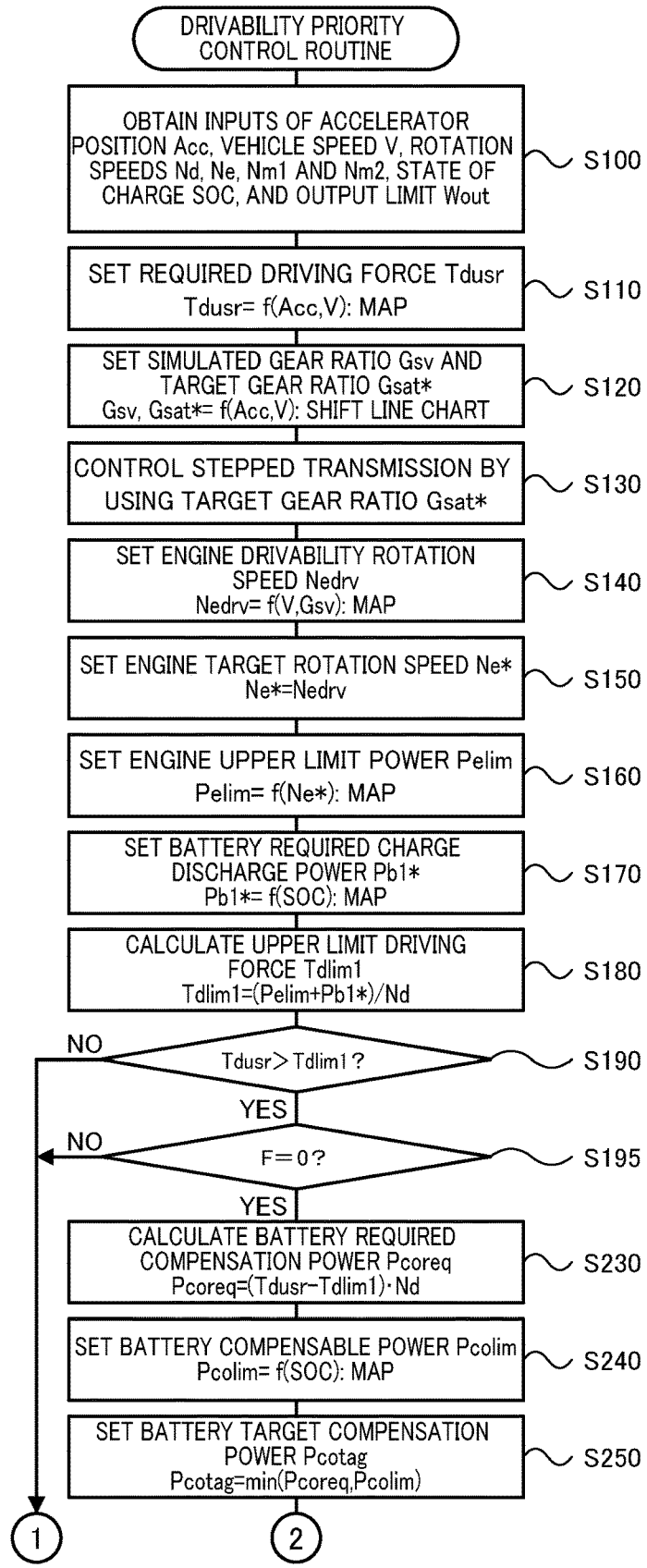
FIG. 5 is a flowchart showing one example of a drivability priority control routine (first half)
Figure 6:
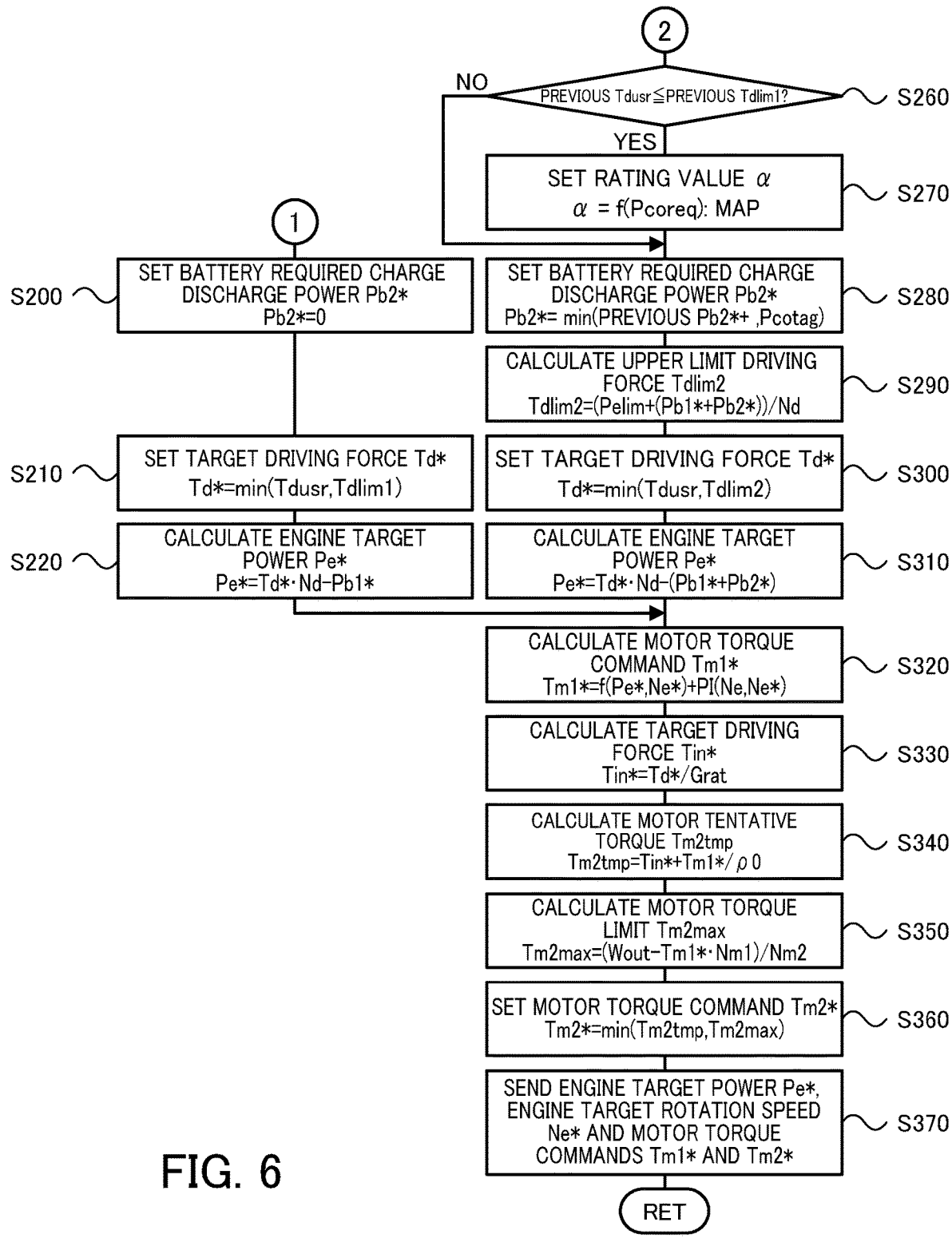
FIG. 6 is a flowchart showing one example of the drivability priority control routine (latter half)

The following describes the operations of the hybrid vehicle 20 configured as described above or more specifically a series of operations when the hybrid vehicle 20 is driven by HV drive at the shift position SP set to the D position with selection of the drivability priority mode as the working drive mode by the driver's operation of the mode switch 90. FIG. 5 and FIG. 6 are flowcharts showing one example of a drivability priority control routine performed by the HVECU 70. This routine is performed repeatedly when the hybrid vehicle 20 is driven by HV drive at the shift position SP set to the D position with selection of the drivability priority mode as the working drive mode by the driver's operation of the mode switch 90.

When the drivability priority control routine of FIGS. 5 and 6 is triggered, the HVECU 70 first obtains input data of, for example, the accelerator position Acc, the vehicle speed V, the rotation speed Nd of the driveshaft 36, the rotation speed Ne of the engine 22, the rotation speeds Nm1 and Nm2 of the motors MG1 and MG2 and the state of charge SOC and the output limit Wout of the battery 50, gear shift line information related to the gear shift line (upshift line or downshift line), and the battery power compensation prohibition flag F (step S100). The accelerator position Acc input here is a value detected by the accelerator pedal position sensor 84. The vehicle speed V input here is a value detected by the vehicle speed sensor 88. The rotation speed Nd of the driveshaft 36 input here is a value detected by the rotation speed sensor 36a. The rotation speed Ne of the engine 22 input here is a value calculated by the engine ECU 24. The rotation speeds Nm1 and Nm2 of the motors MG1 and MG2 input here are values calculated by the motor ECU 40. The state of charge SOC and the output limit Wout of the battery 50 input here are values calculated by the battery ECU 52. The gear shift line information and the battery power compensation prohibition flag F input here are values set by the gear shift line setting routine, which will be described later. In the embodiment, the gear shift line is selected from the first type gear shift line and the second type gear shift line. The first type gear shift line is a normal gear shift line, and the second type gear shift line is a gear shift line in which at least a part of the first type gear shift line is moved to a high-speed side or a low-accelerator position side with respect to the first type gear shift line. The battery power compensation prohibition flag F is set to a value 0 when the battery power compensation is not prohibited and set to a value 1 when the battery power compensation is prohibited. The details of the battery power compensation will be described later.

Figure 7:
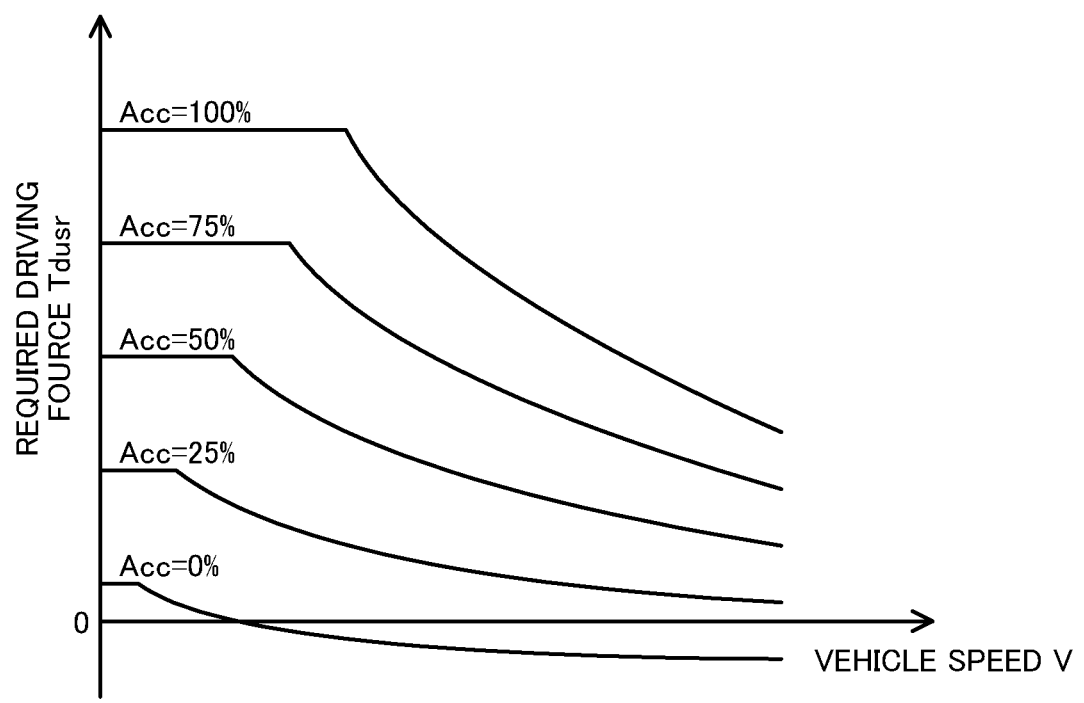
FIG. 7 is a diagram illustrating one example of a required driving force setting map.

The HVECU 70 sets a required driving force Tdusr that is required for driving (required for the driveshaft 36) according to a required driving force setting map by using the accelerator position Acc and the vehicle speed V (step S110). The required driving force setting map is set in advance to specify a relationship among the accelerator position Acc, the vehicle speed V and the required driving force Tdusr and is stored in the non-illustrated ROM. FIG. 7 is a diagram illustrating one example of the required driving force setting map.

The HVECU 70 subsequently sets a simulated gear ratio Gsv and a target gear ratio Gsat* according to a gear shift line chart by using the accelerator position Acc and the vehicle speed V (step S120). The simulated gear ratio Gsv denotes a gear ratio of the ten-speed simulated transmission. The target gear ratio Gsat* denotes a target gear ratio of the four-speed stepped transmission 60. The gear shift line chart is set in advance to specify a relationship among the accelerator position Acc, the vehicle speed V, the simulated gear ratio Gsv and the target gear ratio Gsat*.

Figure 8:
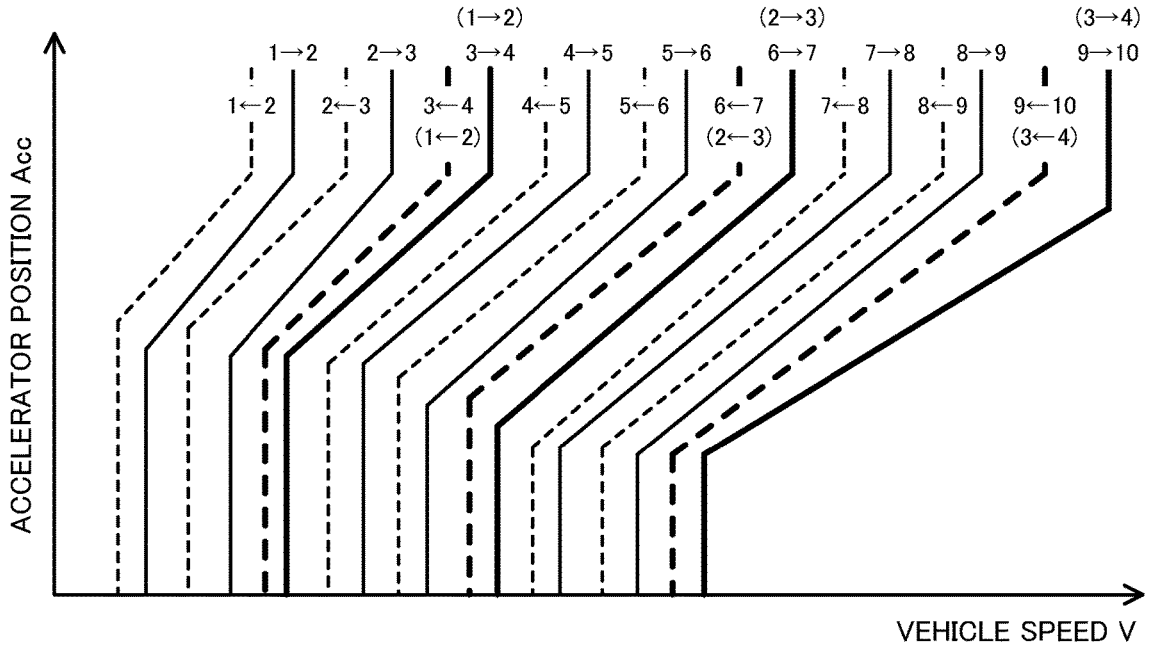
FIG. 8 is a diagram illustrating one example of a gear shift line chart.
Figure 8:
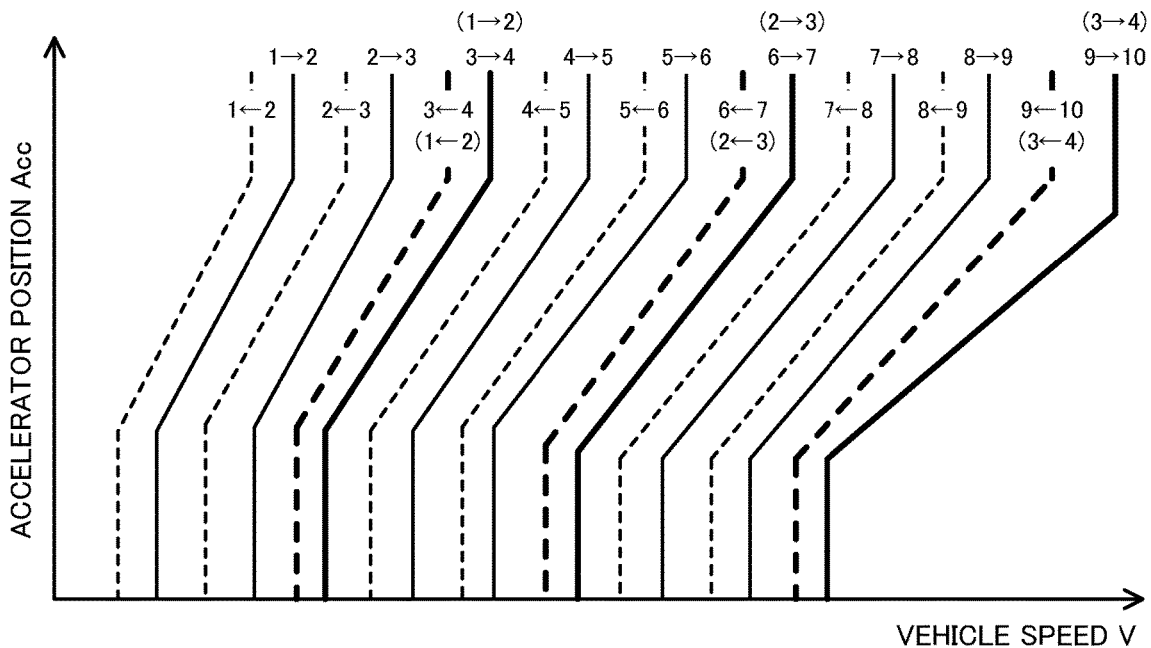

FIG. 8 is a diagram illustrating one example of the gear shift line chart. FIG. 8(A) illustrates one example of the gear shift line chart when the first type gear shift line is used, and FIG. 8(B) illustrates one example of the gear shift line chart when the second type gear shift line is used. In FIGS. 8(A) and 8(B), solid lines (thin solid lines and thick solid lines) indicate gear shift lines for upshift, and broken lines (thin broken lines and thick broken lines) indicate gear shift lines for downshift. The simulated gear ratio Gsv is set as one of the respective gear ratios of the ten speeds to be corresponded to, based on all the gear shift lines shown in FIG. 8(A) or 8(B). The target gear ratio Gsat* is set as one of the respective gear ratios of the four speeds to be corresponded to, based on the gear shift lines of the thick solid lines and the thick broken lines shown in FIG. 8(A) or 8(B).

After setting the target gear ratio Gsat*, the HVECU 70 controls the stepped transmission 60 by using the target gear ratio Gsat* (step S130). When a gear ratio Gsat is equal to the target gear ratio Gsat*, the stepped transmission 60 keeps the gear ratio Gsat unchanged. When the gear ratio Gsat is different from the target gear ratio Gsat*, on the other hand, the stepped transmission 60 changes the gear ratio Gsat, such that the gear ratio Gsat becomes equal to the target gear ratio Gsat*. The stepped transmission 60 is similarly controlled when the hybrid vehicle 20 is driven by HV drive or by EV drive with selection of the ordinary mode as the working drive mode. The process of changing the gear ratio Gsat takes the longer time than the execution cycle of this routine.

After setting the simulated gear ratio Gsv, the HVECU 70 sets a drivability rotation speed Nedrv of the engine 22 according to a drivability rotation speed setting map by using the vehicle speed V and the simulated gear ratio Gsv (step S140). The HVECU 70 subsequently sets a target rotation speed Ne* of the engine 22 to the drivability rotation speed Nedrv of the engine 22 (step S150). The drivability rotation speed setting map is set in advance to specify a relationship among the vehicle speed V, the simulated gear ratio Gsv and the drivability rotation speed Nedrv of the engine 22 and is stored in the non-illustrated ROM.

Figure 9:
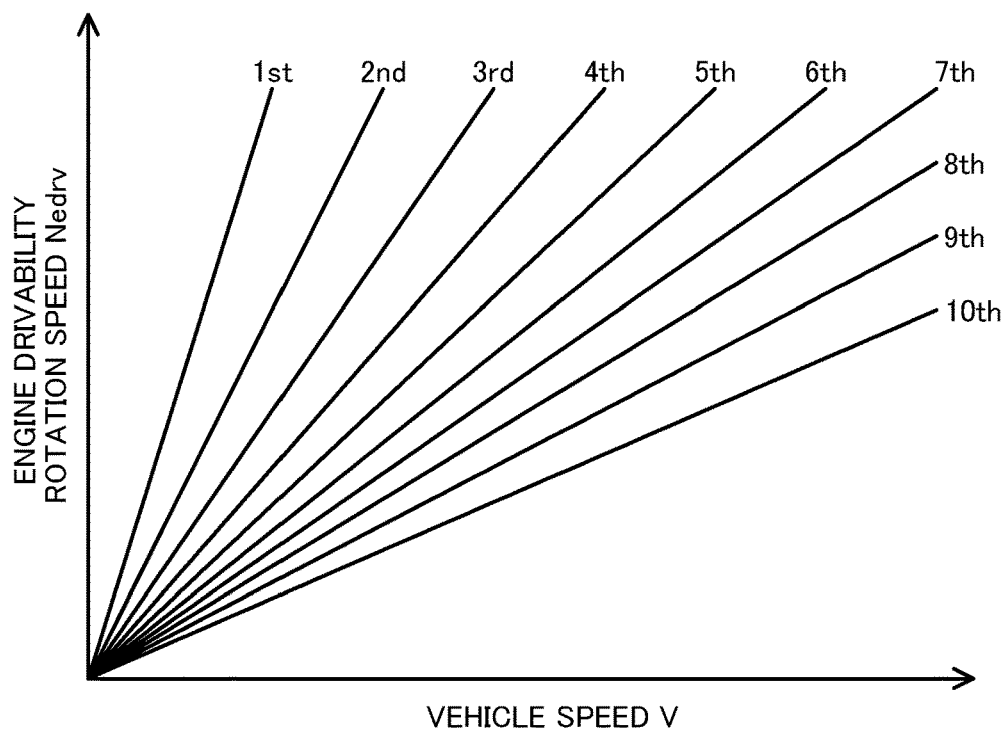
FIG. 9 is a diagram illustrating one example of a drivability rotation speed setting map.

FIG. 9 is a diagram illustrating one example of the drivability rotation speed setting map. As illustrated, the drivability rotation speed Nedrv of the engine 22 is set to linearly increase with an increase in the vehicle speed V at each of the simulated gear ratios Gsv of the ten-speed simulated transmission and to provide the smaller slope against the vehicle speed V at the larger simulated gear ratio Gsv of this simulated transmission. When the engine 22 is operated at the drivability rotation speed Nedrv, such setting causes the rotation speed Ne of the engine 22 to increase with an increase in the vehicle speed V at each of the simulated gear ratios Gsv of the ten-speed simulated transmission. The rotation speed Ne of the engine 22 decreases in the course of upshift of the simulated gear ratio Gsv and increases in the course of downshift of the simulated gear ratio Gsv. As a result, the hybrid vehicle 20 causes the behavior of the rotation speed Ne of the engine 22 to become closer to the behavior of an engine rotation speed of a motor vehicle equipped with an actual ten-speed stepped transmission.

Figure 10:
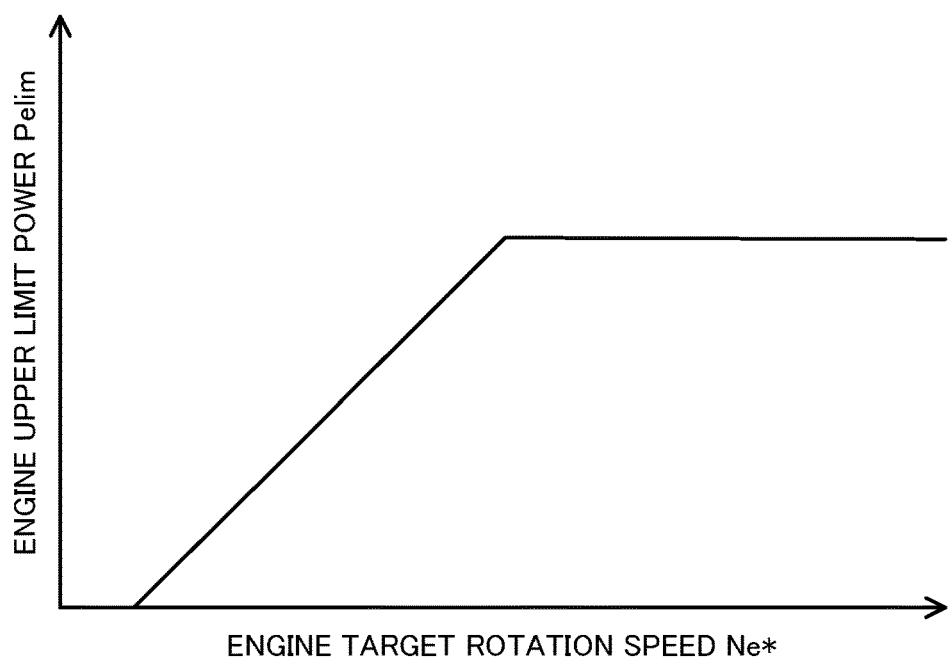
FIG. 10 is a diagram illustrating one example of an upper limit power setting map.

After setting the target rotation speed Ne* of the engine 22, the HVECU 70 sets an upper limit power Pelim of the engine 22 according to an upper limit power setting map by using the target rotation speed Ne* of the engine 22 (step S160). The upper limit power Pelim of the engine 22 denotes an upper limit of power that can be output from the engine 22 when the engine 22 is operated at the target rotation speed Ne* (drivability rotation speed Nedrv). The upper limit power setting map is set in advance to specify a relationship between the target rotation speed Ne* and the upper limit power Pelim of the engine 22 and is stored in the non-illustrated ROM. FIG. 10 is a diagram illustrating one example of the upper limit power setting map. As illustrated, the upper limit power Pelim of the engine 22 is set to increase with an increase in the target rotation speed Ne* of the engine 22.

The HVECU 70 subsequently sets a required charge discharge power Pb1* of the battery 50 (which has a positive value when the battery 50 is discharged) such that the state of charge SOC of the battery 50 becomes closer to a target state of charge SOC*, according to a required charge discharge power setting map by using the state of charge SOC of the battery 50 (step S170). The required charge discharge power setting map is set in advance to specify a relationship between the state of charge SOC and the required charge discharge power Pb1* of the battery 50 and is stored in the non-illustrated ROM.

Figure 11:
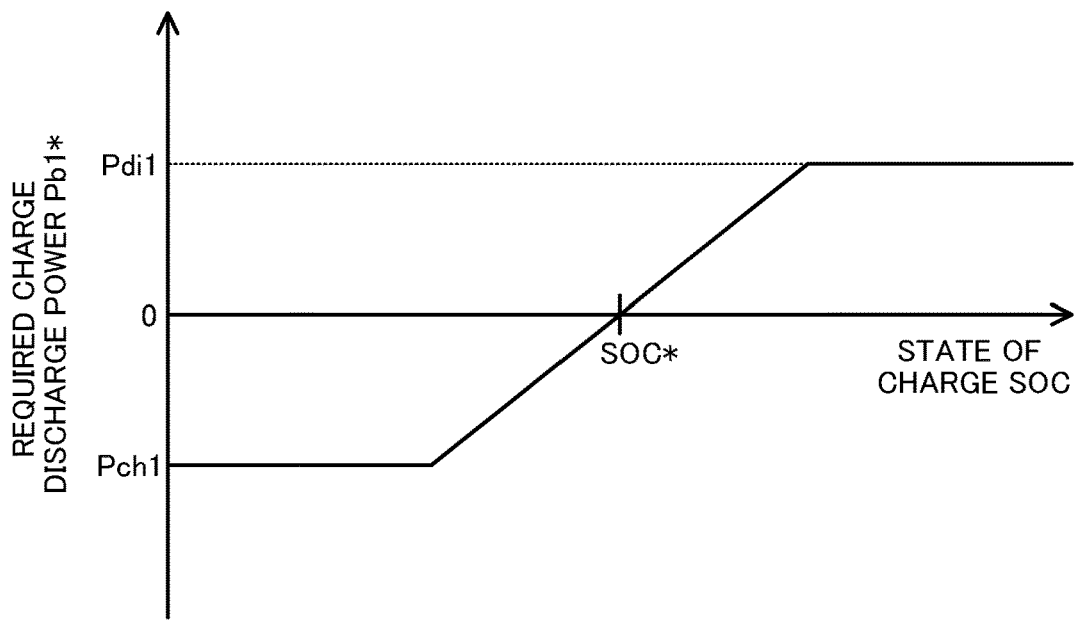
FIG. 11 is a diagram illustrating one example of a required charge discharge power setting map.

FIG. 11 is a diagram illustrating one example of the required charge discharge power setting map. As illustrated, when the state of charge SOC of the battery 50 is equal to the target state of charge SOC*, the required charge discharge power Pb1* of the battery 50 is set to a value 0. Furthermore, when the state of charge SOC is higher than the target state of charge SOC*, the required charge discharge power Pb1* is set to increase from a value 0 to a predetermined discharging (positive) power Pdi1 with an increase in the state of charge SOC and to be kept constant at the predetermined power Pdi1. Moreover, when the state of charge SOC is lower than the target state of charge SOC*, the required charge discharge power Pb1* is set to decrease from the value 0 to a predetermined charging (negative) power Pch1 with a decrease in the state of charge SOC and to be kept constant at the predetermined power Pch1.

The HVECU 70 subsequently calculates an upper limit driving force Tdlim1 by dividing the sum of the upper limit power Pelim of the engine 22 and the required charge discharge power Pb1* of the battery 50 by the rotation speed Nd of the driveshaft 36 according to Expression (1) given below (step S180). The upper limit driving force Tdlim1 denotes an upper limit of driving force that can be output to the driveshaft 36 when the upper limit power Pelim is output from the engine 22 that is operated at the target rotation speed Ne* (drivability rotation speed Nedrv) and the battery 50 is charged or discharged with the required charge discharge power Pb1*. In Expression (1), the required charge discharge power Pb1* of the battery 50 is added to the upper limit power Pelim of the engine 22, with a view to suppressing a variation in power output from the engine 22 when the battery 50 is charged or discharged with the required charge discharge power Pb1*.

$$Tdlim1=(Pelim+Pb1^*)/Nd \quad (1)$$

The HVECU 70 subsequently compares the required driving force Tdusr with the upper limit driving force Tdlim1 (step S190). Such comparison is a process of determining whether or not the required driving force Tdusr can be output to the driveshaft 36, accompanied with charge or discharge of the battery 50 with the required charge discharge power Pb1*.

When the required driving force Tdusr is equal to or smaller than the upper limit driving force Tdlim1, the HVECU 70 determines that the required driving force Tdusr can be output to the driveshaft 36, accompanied with charge or discharge of the battery 50 with the required charge discharge power Pb1*. The HVECU 70 then sets a required charge discharge power Pb2* of the battery 50 (which has a positive value when the battery 50 is discharged) to a value 0 (step S200). The HVECU 70 then sets the target driving force Td* that is to be output to the drive shaft 36 to the smaller between the required driving force Tdusr and the upper limit driving force Tdlim1 according to Expression (2) given below (step S210). The details of the required charge discharge power Pb2* of the battery 50 will be described later.

$$Td^*=\min(Tdusr,Tdlim1) \quad (2)$$

The HVECU 70 subsequently calculates a target power Pe* that is to be output from the engine 22 by subtracting the required charge discharge power Pb1* of the battery 50 from the product of the target driving force Td* and the rotation speed Nd of the driveshaft 36 according to Expression (3) given below (step S220). In Expression (3), the product of the target driving force Td* and the rotation speed Nd of the driveshaft 36 denotes a target power Pd* that is to be output to the driveshaft 36. The target power Pe* of the engine 22 obtained by Expression (3) denotes a power of the engine 22 required to output the target driving force Td* to the driveshaft 36, accompanied with charge or discharge of the battery 50 with the required charge discharge power Pb1*. Further, the HVECU 70 sets the target driving force Td* to the smaller between the required driving force Tdusr and the upper limit driving force Tdlim1. By taking into account Expression (1) and Expression (3), it is understood that the target power Pe* of the engine 22 is equal to or smaller than the upper limit power Pelim.

$$Pe^*=Td^* \cdot Nd-Pb1^* \quad (3)$$

After setting the target power Pe* and the target rotation speed Ne* of the engine 22, the HVECU 70 calculates a torque command Tm1* of the motor MG1 according to Expression (4) given below by using the rotation speed Ne, the target rotation speed Ne* and the target power Pe* of the engine 22 and the gear ratio ρ0 of the planetary gear 30 (step S320). Expression (4) is a relational expression of feedback control to rotate the engine 22 at the target rotation speed Ne*. In Expression (4), a first term on the right side is a feedforward term, a second term on the right side is a proportional of a feedback term, and a third term on the right side is an integral term of the feedback term. The first term on the right side indicates a torque that causes the motor MG1 to receive a torque output from the engine 22 and applied to the rotating shaft of the motor MG1 via the planetary gear 30. In Expression (4), "kp" of the second term on the right side denotes a gain of the proportional, and "ki" of the third term on the right side denotes a gain of the integral term.

$$Tm1^*=-(Pe^*/Ne^*) \cdot [\rho 0/(1+\rho 0)]+kp \cdot (Ne^*-Ne)+ki \cdot \int (Ne^*-Ne)dt \quad (4)$$

The HVECU 70 subsequently calculates a target driving force Tin* that is to be output to the input shaft 61 of the stepped transmission 60 by dividing the target driving force Td* by a gear ratio Grat of the stepped transmission 60 (step S330). The gear ratio Grat of the stepped transmission 60 used here is, for example, a value obtained by dividing the rotation speed Nm2 of the motor MG2 (i.e., the rotation speed of the input shaft 61 of the stepped transmission 60) by the rotation speed Nd of the driveshaft 36.

The HVECU 70 subsequently calculates a tentative torque Tm2tmp that is a tentative value of a torque command Tm2* of the motor MG2 by subtracting a torque (−Tm1*/ρ0) from the target driving force Tin* according to Expression (5) given below (step S340). In Expression (5), the torque (−Tm1*/ρ0) denotes a torque output from the motor MG1 and applied to the driveshaft 36 via the planetary gear 30 when the motor MG1 is driven with the torque command Tm1*.

$$Tm2tmp=Tin^*+Tm1^*/\rho 0 \quad (5)$$

The HVECU 70 subsequently calculates a torque limit Tm2max of the motor MG1 by subtracting the product of the torque command Tm1* and the rotation speed Nm1 of the motor MG1 from the output limit Wout of the battery 50 and dividing the difference by the rotation speed Nm2 of the motor MG2 according to Expression (6) given below (step S350). In Expression (6), the product of the torque command Tm1* and the rotation speed Nm1 of the motor MG1 denotes an electric power of the motor MG1 (which has a positive value when the motor MG1 is power-driven). The HVECU 70 then sets the torque command Tm2* of the motor MG2 to the smaller between the tentative torque Tm2*tmp* and the torque limit Tm2max of the motor MG2 according to Expression (7) given below (step S360).

$$Tm2\text{max}=(W\text{out}-Tm1^*\cdot Nm1)/Nm2 \quad (6)$$

$$Tm2^*=\min(Tm2tmp, Tm2\text{max}) \quad (7)$$

After obtaining the target power Pe* and the target rotation speed Ne* of the engine 22 and the torque commands Tm1* and Tm2* of the motors MG1 and MG2, the HVECU 70 sends the target power Pe* and the target rotation speed Ne* of the engine 22 to the engine ECU 24 and sends the torque commands Tm1* and Tm2* of the motors MG1 and MG2 to the motor ECU 40 (step S370) and then terminates this routine.

When receiving the target power Pe* and the target rotation speed Ne* of the engine 22, the engine ECU 24 performs operation control of the engine 22 (for example, intake air flow control, fuel injection control and ignition control), such that the engine 22 is operated based on the target power Pe* and the target rotation speed Ne*. When receiving the torque commands Tm1* and Tm2* of the motors MG1 and MG2, the motor ECU 40 performs switching control of the plurality of switching elements included in the inverters 41 and 42, such that the motors MG1 and MG2 are respectively driven with the torque commands Tm1* and Tm2*.

When the required driving force Tdusr is equal to or smaller than the upper limit driving force Tdlim1, the HVECU 70 in cooperation with the engine ECU 24 and the motor ECU 40 controls the engine 22 and the motors MG1 and MG2, such that the engine 22 is operated at the target rotation speed Ne* (drivability rotation speed Nedrv) and that the target driving force Td* set to the required driving force Tdusr is output to the driveshaft 36 in the range of the output limit Wout of the battery 50.

When the required driving force Tdusr is larger than the upper limit driving force Tdlim1 at step S190, on the other hand, the HVECU 70 determines that the required driving force Tdusr cannot be output to the driveshaft 36, accompanied with charge or discharge of the battery 50 with the required charge discharge power Pb1*. In this state, the HVECU 70 determines that there is a requirement for battery power compensation. The battery power compensation aims to make the driving force that can be output to the driveshaft 36 larger than the upper limit driving force Tdlim1 by charging or discharging the battery 50 with such an electric power that is larger in the discharging state (that is smaller in the charging state) than the required charge discharge power Pb1*.

The HVECU 70 subsequently examines the value of the battery power compensation prohibition flag F (step S195). When the battery power compensation prohibition flag F is set to a value 0, the HVECU 70 determines that the battery power compensation is not prohibited. The HVECU 70 subsequently calculates a required compensation power Pcoreq of the battery 50 by subtracting the upper limit driving force Tdlim1 from the required driving force Tdusr and multiplying the difference by the rotation speed Nd of the driveshaft 36 according to Expression (8) given below (step S230). The HVECU 70 subsequently sets a compensable power Pcolim of the battery 50 in a range of not higher than the output limit Wout of the battery 50 according to a compensable power setting map by using the state of charge SOC of the battery 50 (step S240). The compensable power setting map is set in advance to specify a relationship between the state of charge SOC and the compensable power Pcolim of the battery 50 and is stored in the non-illustrated ROM.

$$Pcoreq=(Tdusr-Tdlim1)\cdot Nd \quad (8)$$

Figure 12:
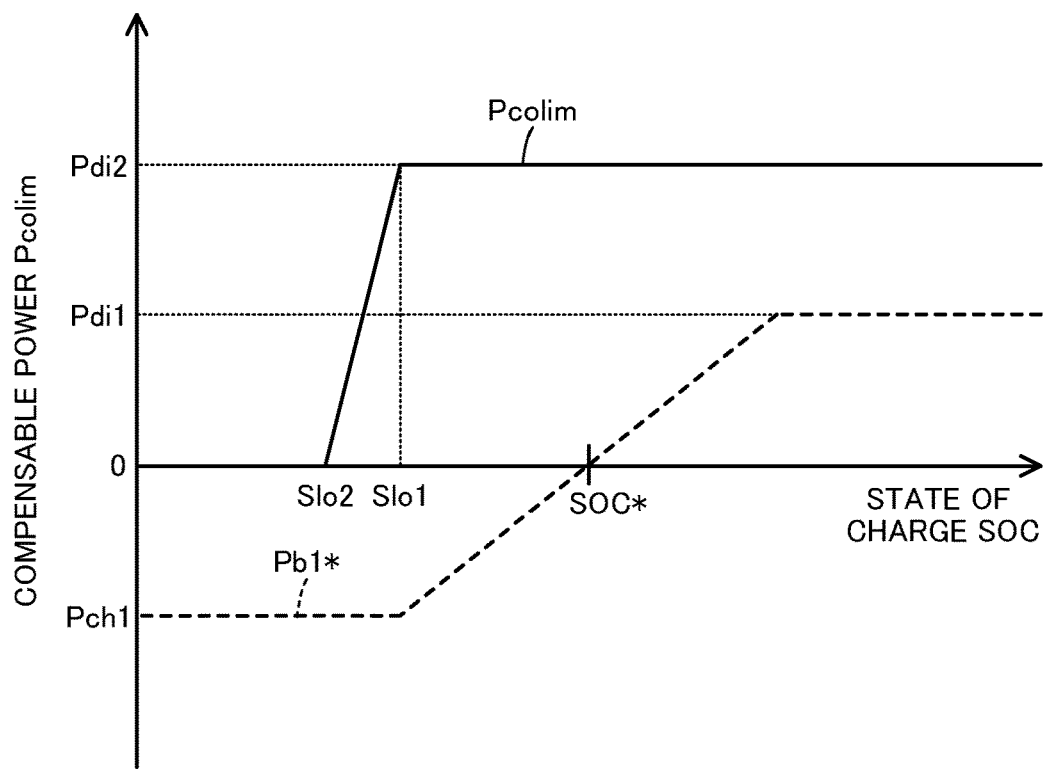
FIG. 12 is is a diagram illustrating one example of a compensable power setting map.

FIG. 12 is a diagram illustrating one example of the compensable power setting map. As illustrated, when the state of charge SOC of the battery 50 is equal to or higher than a reference value Slo1 that is smaller than the target state of charge SOC*, the compensable power Pcolim of the battery 50 is set to a predetermined power Pdi2 that is sufficiently larger than the predetermined power Pdi1 described above. When the state of charge SOC is lower than the reference value Slo1 and is also higher than a reference value Slo2 that is smaller than the reference value Slo1, the compensable power Pcolim is set to decrease from the predetermined power Pdi2 to a value 0 with a decrease in the state of charge SOC. Additionally, when the state of charge SOC is equal to or lower than the reference value Slo2, the compensable power Pcolim is set to the value 0.

After obtaining the required compensation power Pcoreq and the compensable power Pcolim of the battery 50, the HVECU 70 sets a target compensation power Pcotag of the battery 50 to the smaller between the required compensation power Pcoreq and the compensable power Pcolim of the battery 50 according to Expression (9) given below (step S250).

$$Pcotag=\min(Pcoreq, Pcolim) \quad (9)$$

The HVECU 70 subsequently compares a previous required driving force (previous Tdusr) with a previous upper limit driving force (previous Tdlim1) (step S260). Such comparison is a process of determining whether or not the present timing is immediately after the time when the required driving force Tdusr becomes larger than the upper limit driving force Tdlim1, i.e., whether or not the present timing is immediately after a start of the requirement for battery power compensation.

Figure 13:
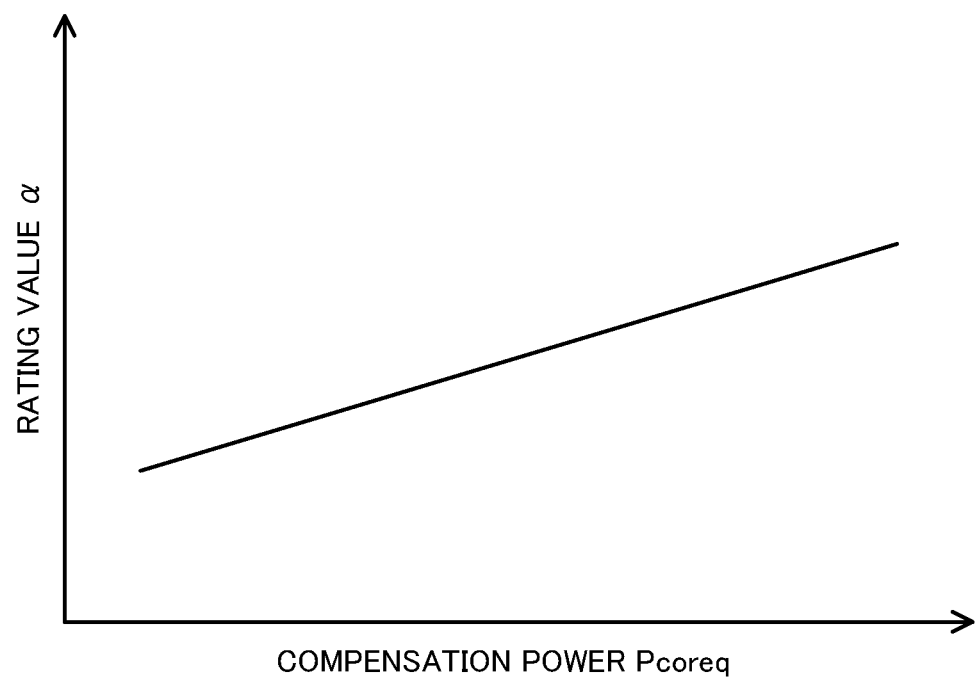
FIG. 13 is a diagram illustrating one example of a rating value setting map.

When the previous required driving force (previous Tdusr) is equal to or smaller than the previous upper limit driving force (previous Tdlim1) at step S260, the HVECU 70 determines that the present timing is immediate after a start of the requirement for battery power compensation. The HVECU 70 then sets a rating value α according to a rating value setting map by using the required compensation power Pcoreq of the battery 50 (step S270). The rating value α is used to increase the required charge discharge power Pb2* of the battery 50 toward the target compensation power Pcotag. The rating value setting map is set in advance to specify a relationship between the required compensation power Pcoreq and the rating value α and is stored in the non-illustrated ROM. FIG. 13 is a diagram illustrating one example of the rating value setting map. As illustrated, the rating value α is set to increase with an increase in the required compensation power Pcoreq. The reason of such setting will be described later.

When the previous required driving force (previous Tdusr) is larger than the previous upper limit driving force (previous Tdlim1) at step S260, on the other hand, the HVECU 70 determines that the present timing is not immediate after a start of the requirement for battery power compensation (i.e., that the requirement for battery power compensation is ongoing) and skips the processing of step S270.

The HVECU 70 subsequently sets the required charge discharge power Pb2* of the battery 50 to the smaller between a value obtained by adding the rating value α to a previous required charge discharge power (previous working compensation power: previous Pb2*) and the target compensation power Pcotag of the battery 50 according to Expression (10) given below (step S280). Such setting of step S280 is a process of calculating the required charge discharge power Pb2* of the battery 50 by a rating process of the target compensation power Pcotag of the battery 50 by using the rating value α.

$$Pb2^*=\min(\text{Previous } Pb2^*+\alpha, Pcotag) \quad (10)$$

Accordingly, when the requirement for battery power compensation is ongoing, the HVECU 70 repeatedly performs this routine, so as to gradually increase the required charge discharge power Pb2* of the battery 50 toward the target compensation power Pcotag of the battery 50. After the required charge discharge power Pb2* of the battery 50 reaches the target compensation power Pcotag, the HVECU 70 gradually decreases the required charge discharge power Pb2* of the battery 50 (to a value 0) with a gradual decrease in the difference between the required driving force Tdusr and the upper limit driving force Tdlim1 (to a value 0), i.e., a gradual decrease in the target compensation power Pcotag.

After obtaining the required charge discharge power Pb2* of the battery 50, the HVECU 70 calculates an upper limit driving force Tdlim2 by dividing a total sum of the upper limit power Pelim of the engine 22 and the required charge discharge powers Pb1* and Pb2* of the battery 50 by the rotation speed Nd of the driveshaft 36 according to Expression (11) given below (step S290).

$$Tdlim2=(Pelim+(Pb1^*+Pb2^*))/Nd \quad (11)$$

The upper limit driving force Tdlim2 denotes an upper limit of driving force that can be output to the driveshaft 36 when the upper limit power Pelim is output from the engine 22 that is operated at the target rotation speed Ne* (drivability rotation speed Nedrv) and the battery 50 is charged or discharged with the total power of the required charge discharge powers Pb1* and Pb2*. This upper limit driving force Tdlim2 differs from the upper limit driving force Tdlim1 described above, since the upper limit driving force Tdlim2 is determined by taking into account the required charge discharge power Pb2* of the battery 50. In Expression (11), the sum of the required charge discharge powers Pb1* and Pb2* of the battery 50 is added to the upper limit power Pelim of the engine 22, with a view to suppressing a variation in power output from the engine 22 when the battery 50 is charged or discharged with the total power of the required charge discharge powers Pb1* and Pb2*.

After obtaining the upper limit driving force Tdlim2, the HVECU 70 sets the target driving force Td* to the smaller between the required driving force Tdusr and the upper limit driving force Tdlim2 according to Expression (12) given below (step S300). The HVECU 70 subsequently calculates the target power Pe* of the engine 22 by subtracting the sum of the required charge discharge powers Pb1* and Pb2* of the battery 50 from the product of the target driving force Td* and the rotation speed Nd of the driveshaft 36 according to Expression (13) given below (step S310), performs the processing of steps S320 to S370 and then terminates this routine.

$$Td^*=\min(Tdusr, Tdlim2) \quad (12)$$

$$Pe^*=Td^* \cdot Nd-(Pb1^*+Pb2^*) \quad (13)$$

The target power Pe* of the engine 22 obtained by Expression (13) denotes a power of the engine 22 required to output the target driving force Td* to the driveshaft 36, accompanied with charge or discharge of the battery 50 with the total power of the required charge discharge powers Pb1* and Pb2*. The HVECU 70 sets the target driving force Td* to the smaller between the required driving force Tdusr and the upper limit driving force Tdlim2. By taking into account Expression (11) and Expression (13) given above, it is accordingly understood that the target power Pe* of the engine 22 becomes equal to or smaller than the upper limit power Pelim.

Additionally, the processing of steps S290, S300 and S330 to S360 causes the required charge discharge power Pb2* of the battery 50 to be reflected on the upper limit driving force Tdlim2, the target driving force Td*, the target driving force Tin* and the torque command Tm2* of the motor MG2 and thereby to be reflected on the driving force output to the driveshaft 36.

The HVECU 70 performs the control described above to set the upper limit driving force Tdlim2, based on the total sum of the upper limit power Pelim of the engine 22 and the required charge discharge powers Pb1* and Pb2* of the battery 50, when the required driving force Tdusr is larger than the upper limit driving force Tdlim1. The HVECU 70 in cooperation with the engine ECU 24 and the motor ECU 40 controls the engine 22 and the motors MG1 and MG2, such that the engine 22 is operated at the target rotation speed Ne* (drivability rotation speed Nedrv) and that the target driving force Td* set to the smaller between the required driving force Tdusr and the upper limit driving force Tdlim2 is output to the driveshaft 36 in the range of the output limit Wout of the battery 50. The hybrid vehicle 20 enables a larger driving force than the upper limit driving force Tdlim1 to be output to the driveshaft 36 by charging or discharging the battery 50 with the total power of the required charge discharge powers Pb1* and Pb2*. In other words, battery power compensation is performed in the hybrid vehicle 20. The hybrid vehicle 20 accordingly suppresses a reduction of the driving force output to the driveshaft 36 when the upper limit driving force Tdlim1 decreases in the course of upshift of the simulated gear ratio Gsv to become smaller than the required driving force Tdusr. As a result, the hybrid vehicle 20 suppresses deterioration of the driver's drive feeling.

Furthermore, when the required driving force Tdusr is larger than the upper limit driving force Tdlim1, the HVECU 70 increases the required charge discharge power Pb2* of the battery 50 toward the required compensation power Pcoreq by using the rating value α that increases with an increase in the required compensation power Pcoreq immediately after the required driving force Tdusr becomes larger than the upper limit driving force Tdlim1 (immediately after a start of the requirement for battery power compensation). As the target rotation speed Ne* (drivability rotation speed Nedrv) of the engine 22 decreases in the course of upshift of the simulated gear ratio Gsv, the rotation speed Ne and the output power Pe of the engine 22 decrease correspondingly (with a response delay). The decrease rates (amounts of decrease per unit time) of the rotation speed Ne and the output power Pe of the engine 22 generally increase with an increase in the difference between the required driving force Tdusr and the upper limit driving force Tdlim1. Accordingly, setting the rating value α by the HVECU 70 as described above enables the hybrid vehicle 20 to more appropriately suppress a reduction of the driving force output to the driveshaft 36 when the upper limit driving force Tdlim1 becomes smaller than the target driving force Td* in the course of upshift. It is possible that the HVECU 70 specifies in advance a relationship between the required compensation power Pcoreq and the rating value α by experiments and analyses and creates a rating value setting map such that the decrease rate of the output power Pe of the engine 22 is approximately synchronous with an increase rate of the required charge discharge power Pb2* of the battery 50.

When the battery power compensation prohibition flag F is set to a value 1 at step S195, the HVECU 70 determines that the battery power compensation is prohibited, performs the processing of steps S200 to S220 and steps S320 to S370 and then terminates this routine. In this case, the battery power compensation is not performed.

Figure 14:
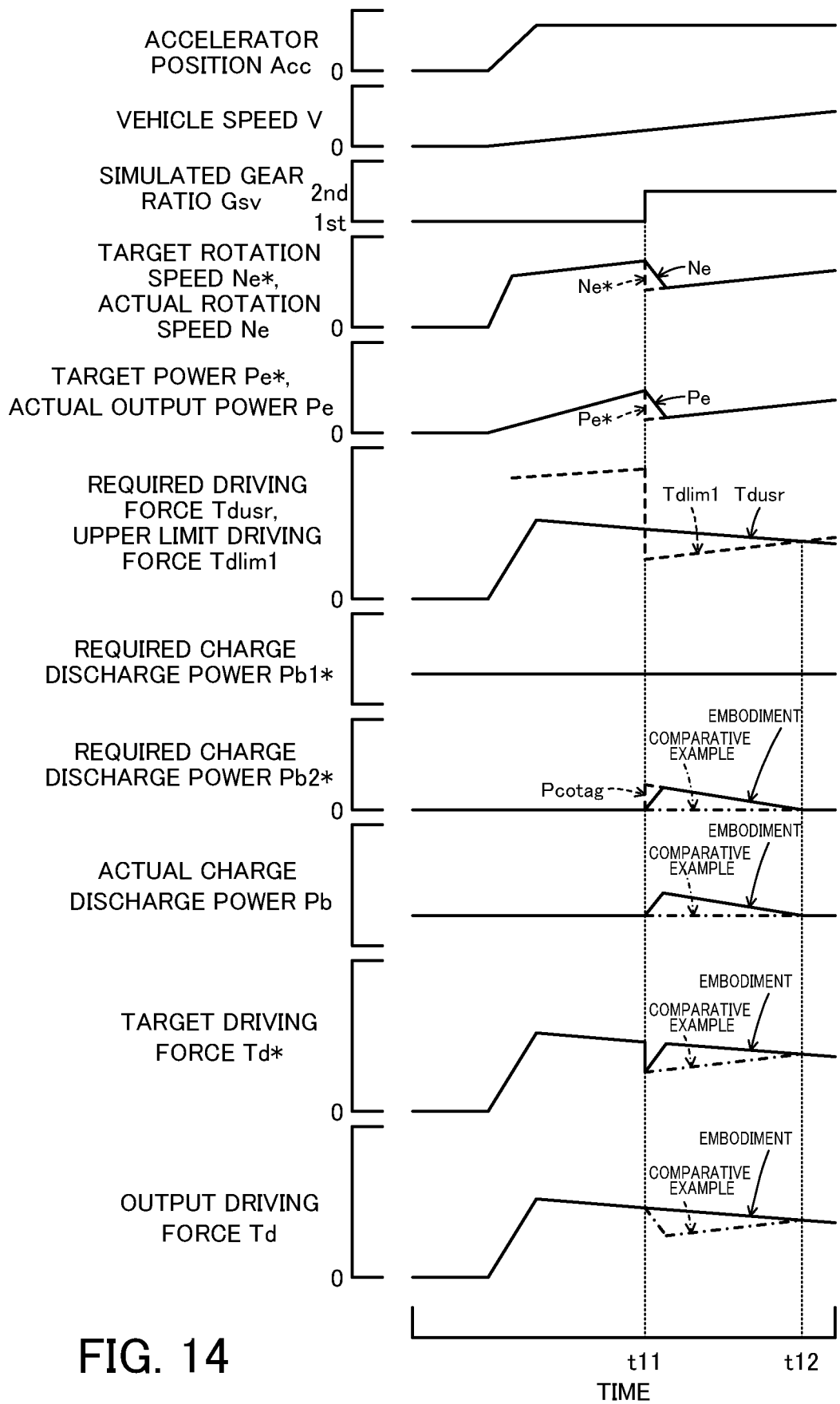
FIG. 14 is a diagram illustrating one example of variations in an accelerator position Acc, a vehicle speed V, a simulated gear ratio Gsv, a target rotation speed Ne* and an actual rotation speed Ne of the engine, a target power Pe* and an actual output power Pe of the engine, a required driving force Tdusr and an upper limit driving force Tdlim1, a required charge discharge power Pb1*, a required charge discharge power Pb2* and an a target driving force Td* and an output driving force Td when battery power compensation is not prohibited.

FIG. 14 is a diagram illustrating one example of variations in an accelerator position Acc, a vehicle speed V, a simulated gear ratio Gsv, a target rotation speed Ne* and an actual rotation speed Ne of the engine, a target power Pe* and an actual output power Pe of the engine, a required driving force Tdusr and an upper limit driving force Tdlim1, a required charge discharge power Pb1*, a required charge discharge power Pb2* and an actual charge discharge power Pb of a battery, a target driving force Td* and an actual driving force (output driving force Td) output to the driving shaft 36 when battery power compensation is not prohibited. In this diagram, the target compensation power Pcotag of the battery 50 is additionally shown in the graph of the required charge discharge power Pb2* of the battery 50 for the purpose of reference. In the diagram, solid line curves indicate variations of the embodiment and one-dot chain line curves indicate variations of a comparative example with regard to the required charge discharge power Pb2* and the charge discharge power Pb of the battery 50, the target driving force Td* and the output driving force Td. The comparative example is a case where the required charge discharge power Pb2* of the battery 50 is not taken into account, i.e., a case where the required charge discharge power Pb2* of the battery 50 is set to the value 0 irrespective of the magnitude relationship between the required driving force Tdusr and the upper limit driving force Tdlim1 and where the upper limit driving forces Tdlim1 and Tdlim2 are equal to each other.

As illustrated, the comparative example has a reduction of the output driving force Td relative to the required driving force Tdusr for a time period when the required driving force Tdusr is equal to or larger than the upper limit driving force Tdlim1 after the upper limit driving force Tdlim1 decreases in the course of upshift of the simulated gear ratio Gsv to become smaller than the required driving force Tdusr (for a time period of t11 to t12).

In the embodiment, on the other hand, when the upper limit driving force Tdlim1 decreases in the course of upshift of the simulated gear ratio Gsv to become smaller than the required driving force Tdusr (at a time t11), the required charge discharge power Pb2* and accordingly the charge discharge power Pb of the battery 50 increase toward the target compensation power Pcotag to reach the target compensation power Pcotag, so that the target driving force Td* and accordingly the output driving force Td become larger than the upper limit driving force Tdlim1 (for a time period of t11 to t12). The hybrid vehicle 20 of this configuration accordingly suppresses a reduction of the output driving force Td relative to the required driving force Tdusr. Furthermore, in the illustrated example of FIG. 14, when the upper limit driving force Tdlim1 becomes smaller than the required driving force Tdusr (at the time t11), the required charge discharge power Pb2* and accordingly the charge discharge power Pb of the battery 50 increase approximately synchronously with a reduction of the output power Pe of the engine 22. This configuration enables the hybrid vehicle 20 to more appropriately suppress the reduction of the output driving force Td relative to the required driving force Tdusr.

Figure 15:
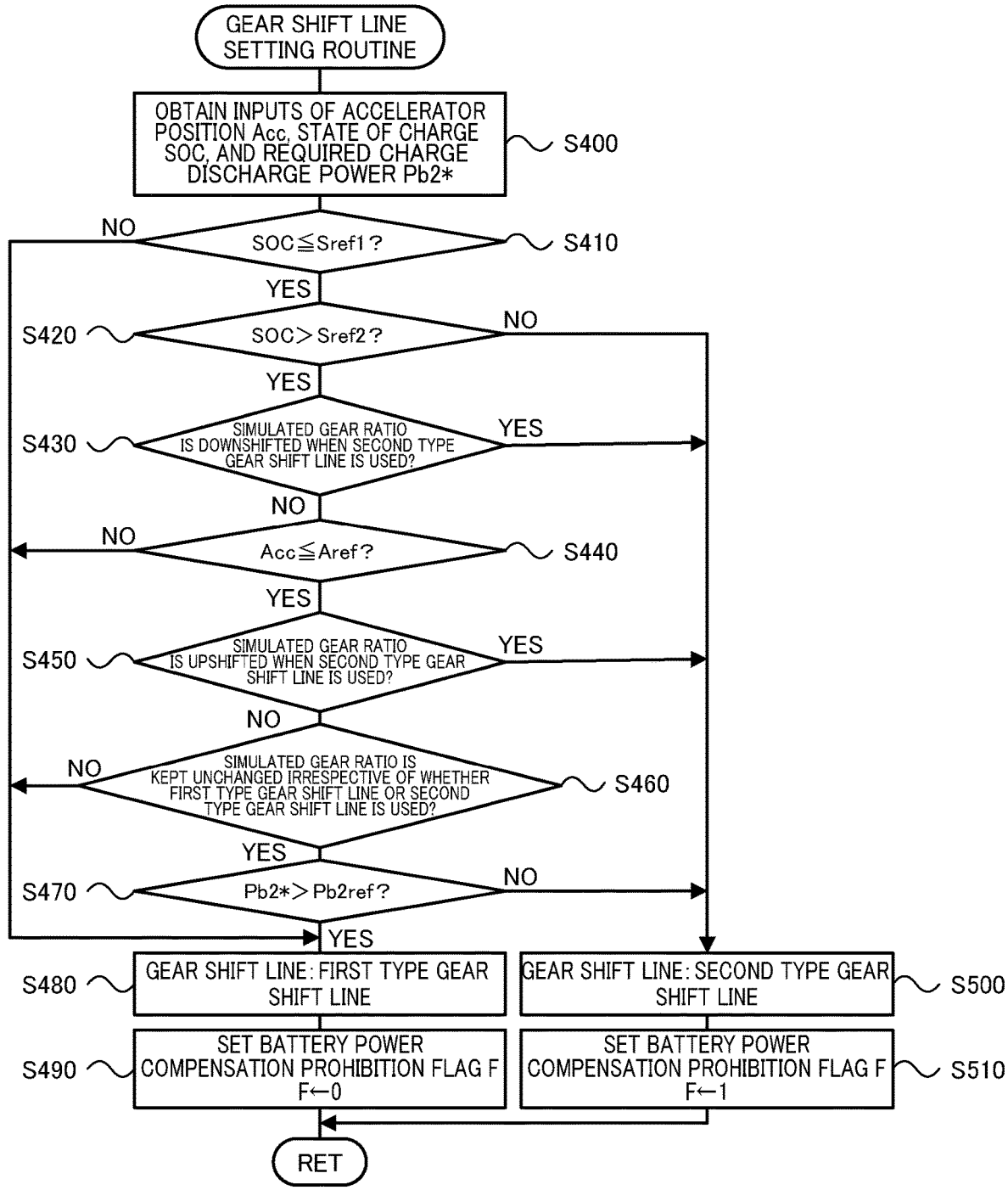
FIG. 15 is a flowchart showing one example of a gear shift line setting routine performed by a hybrid electronic control unit.

The following describes a processing for setting the gear shift line information and the battery power compensation prohibition flag F used in the drivability priority control routine of FIG. 5 and FIG. 6. FIG. 15 is a flowchart showing one example of a gear shift line setting routine performed by the HVECU 70. This routine is performed repeatedly in parallel with the drivability priority control routine of FIG. 5 and FIG. 6.

When the gear shift line setting routine of FIG. 15 is triggered, the HVECU 70 first obtains input data of, for example, the accelerator position Acc, and the state of charge SOC and the required charge discharge power Pb2* of the battery 50 (step S400). The accelerator position Acc input here is a value detected by the accelerator pedal position sensor 84. The state of charge SOC of the battery 50 input here is a value calculated by the battery ECU 52. The required charge discharge power Pb2* of the battery 50 input here is a value set by the drivability priority control routine of FIG. 5 and FIG. 6.

After obtaining the data, the HVECU 70 compares the state of charge SOC of the battery 50 with a reference value Sref1 (step S410). The reference value Sref1 here is a reference value used to determine whether the use of the first type gear shift line can be continued or the use of the second type gear shift line is recommended among the first type gear shift line and the second type gear shift line (see FIGS. 8 (A) and 8 (B)) as the gear shift line. As the reference value Sref1, the same value as or slightly larger value than the above-mentioned reference value Slo1 is used.

When the state of charge SOC of the battery 50 is higher than the reference value Sref1 at step S410, the HVECU 70 determines that use of the first type gear shift line can be continued and sets the first type gear shift line as the gear shift line (step S480). The HVECU 70 sets the battery power compensation prohibition flag F to a value 0 (step S490) and terminates this routine.

In this case, in the drivability priority control routine of FIG. 5 and FIG. 6, the first type gear shift line is used as the gear shift line. In case where the first type gear shift line is used as the gear shift line, upshift of the simulated gear ratio Gsv with the increase in the vehicle speed can be earlier and downshift of the simulated gear ratio Gsv with the increase in the accelerator position Acc can be delayed compared with the case where the second type gear shift line is used (see FIGS. 8 (A) and 8 (B)). This suppresses the increase of the rotation speed Ne of the engine 22.

Further in this case, when the required driving force Tdusr is larger than the upper limit driving force Tdlim1 at step S190 in the drivability priority control routine of FIG. 5 and FIG. 6, the processing of and after step S230 is performed as the battery power compensation prohibition flag F is set to the value 0 at step S195. The battery power compensation is accordingly performed when the required driving force Tdusr is larger than the upper limit driving force Tdlim1.

When the state of charge SOC of the battery 50 is equal to or lower than the reference value Sref1 at step S410 of FIG. 15, the HVECU 70 determines that use of the second type gear shift line is recommended as the gear shift line and compares the state of charge SOC of the battery 50 with a reference value Sref2 that is smaller than the reference value Sref1 (step S420). The reference value Sref2 here is a reference value used to determine whether the use of the second type gear shift line is essential among the first type gear shift line and the second type gear shift line as the gear shift line. As the reference value Sref2, the same value as or slightly smaller value than the above-mentioned reference value Slo2 is used.

When the state of charge SOC of the battery 50 is equal to or lower than the reference value Sref2 at step S420, the HVECU 70 determines that use of the second type gear shift line is essential as the gear shift line. The HVECU 70 sets the second type gear shift line as the gear shift line (step S500). The HVECU 70 sets the battery power compensation prohibition flag F to a value 1 (step S510) and terminates this routine.

In this case, in the drivability priority control routine of FIG. 5 and FIG. 6, the second type gear shift line is used as the gear shift line. In case where the second type gear shift line is used as the gear shift line, upshift of the simulated gear ratio Gsv with the increase in the vehicle speed V becomes slower and downshift of the simulated gear ratio Gsv with the increase in the accelerator position Acc becomes faster compared with the case where the first type gear shift line is used (see FIGS. 8 (A) and 8 (B)). Accordingly, the rotation speed Ne (target rotation speed Ne*), the upper limit power Pelim and the upper limit driving force Tdlim1 are likely to be larger. This suppresses the required driving force Tdusr to be larger than the upper limit driving force Tdlim1 (i.e., less demanding of battery power compensation). The hybrid vehicle 20 accordingly suppresses the decrease of the state of charge SOC of the battery 50.

Further, when the required driving force Tdusr is larger than the upper limit driving force Tdlim1 at step S190 in the drivability priority control routine of FIG. 5 and FIG. 6, the processing of and after step S200 is performed as the battery power compensation prohibition flag F is set to the value 1 at step S195. As the battery power compensation is not performed, the decrease of the state of charge SOC of the battery 50 is further suppressed.

As a result, it is possible to suppress the state of charge SOC of the battery 50 to be excessively decreased and cause over discharge, and to protect the battery 50.

When the state of charge SOC of the battery 50 is higher than the reference value Sref2 at step S420, the HVECU 70 determines that use of the second type gear shift line is recommended but not essential, and determines whether the simulated gear ratio Gsv is downshifted when the second type gear shift line is used (step S430). The HVECU 70 sets the second type gear shift line as the gear shift line when the simulated gear ratio Gsv is downshifted when the second type gearshift line is used (step S500). The HVECU 70 subsequently sets the battery power compensation prohibition flag F to a value 1 (step S510) and terminates this routine.

Based on the condition at step S430, when the gear shift line is switched from the first type gear shift line to the second type gear shift line, the simulated gear ratio Gsv is immediately downshifted. Accordingly, in case where the first type gear shift line is used as the gear shift line and in case of an abrupt increase of depression of the accelerator pedal 83, the simulated gear ratio Gsv is downshifted when the accelerator position Acc straddles the second gear shift line (downshift line). The downshift of the simulated gear ratio Gsv thus can be earlier compared with the case where the simulated gear ratio Gsv is downshifted when the accelerator position Acc straddles the downshift line of the first gear shift line. This suppresses the required charge discharge power Pb2* of the battery 50 to be larger before the downshift of the simulated gear ratio Gsv. Accordingly, it is possible to suppress decrease in the required charge discharge power Pb2* amount (difference between the value immediately before the gear shift line is switched to the second type gear shift line and the value 0) from being increased when the battery power compensation is prohibited by the use of the second type gear shift line as the gear shift line, thereby suppressing the variation in the driving force output to the drive shaft 36.

The battery power compensation is prohibited when the second type gear shift line is used as the gear shift line. Accordingly, the decrease of the state of charge SOC of the battery 50 is further suppressed. As described above, when the state of charge SOC of the battery 50 is lower than the reference value Slot that is equal to or smaller than the reference value Sref1, the compensable power Pcolim is set to decrease with the decrease in the state of charge SOC. The increase of depression of the accelerator pedal 83 is thus easily performed.

When the simulated gear ratio Gsv is not downshifted when the second type gear shift line is used as the gear shift line at step S430, the HVECU 70 compares the accelerator position Acc with a reference value Aref (step S440). The reference value Aref here is a reference value used to determine whether the accelerator position Acc is sufficiently small.

When the accelerator position Acc is larger than the reference value Aref at step S440, the HVECU 70 sets the first type gear shift line as the gear shift line (step S480), sets the battery power compensation prohibition flag F to a value 0 (step S490) and terminates this routine.

When the accelerator position Acc is equal to or smaller than the reference value Aref at step S440, the HVECU 70 determines whether the simulated gear ratio Gsv is upshifted when the second type gear shift line is used (step S450). The HVECU 70 sets the second type gear shift line as the gear shift line when the simulated gear ratio Gsv is upshifted when the second type gear shift line is used (step S500). The HVECU 70 subsequently sets the battery power compensation prohibition flag F to a value 1 (step S510) and terminates this routine.

Based on the condition at step S450, when the gear shift line is switched from the first type gear shift line to the second type gear shift line, the simulated gear ratio Gsv is immediately upshifted. Accordingly, in case where the first type gear shift line is used as the gear shift line and in case of an abrupt decrease of depression of the accelerator pedal 83 (including a releasing operation), the simulated gear ratio Gsv is upshifted when the accelerator position Acc straddles the second gear shift line (upshift line). The upshift of the simulated gear ratio Gsv thus can be delayed compared with the case where the simulated gear ratio Gsv is upshifted when the accelerator position Acc straddles the upshift line of the first gear shift line. As the battery power compensation is prohibited when the second type gear shift line is used as the gear shift line, the decrease of the state of charge SOC of the battery 50 is further suppressed.

When the simulated gear ratio Gsv is not upshifted when the second type gear shift line is used as the gear shift line at step S450, the HVECU 70 determines whether the simulated gear ratio Gsv is kept unchanged irrespective of whether the first type gear shift line is used or the second type gear shift line is used as the gear shift line (step S460). The HVECU 70 subsequently compares the required charge discharge power Pb2* of the battery 50 with a reference value Pb2ref (step S470). The reference value Pb2ref here is a reference value used to determine whether the required charge discharge power Pb2* of the battery 50 is sufficiently small. As the reference value Pb2ref, a value 0 or slightly larger value is used.

When the simulated gear ratio Gsv is different between when the first type gear shift line is used and when the second type gear shift line is used as the gear shift line at step S460, or when the required charge discharge power Pb2* of the battery 50 is larger than the reference value Pb2ref at step S470, the HVECU 70 sets the first type gear shift line as the gear shift line (step S480), sets the battery power compensation prohibition flag F to the value 0 (step S490), and terminates this routine.

When the simulated gear ratio Gsv is kept unchanged irrespective of whether the first type gear shift line is used or the second type gear shift line is used as the gear shift line at step S460, and when the required charge discharge power Pb2* of the battery 50 is equal to or smaller than the reference value Pb2ref at step S470, the HVECU 70 sets the second type gear shift line as the gear shift line (step S500), sets the battery power compensation prohibition flag F to the value 1 (step S510), and terminates this routine.

When the simulated gear ratio Gsv is kept unchanged when the first type gear shift line is used and when the second type gear shift line is used as the gear shift line, and when the required charge discharge power Pb2* of the battery 50 is equal to or smaller than the reference value Pb2ref, it is considered that the behavior of the vehicle is hardly affected even when the gear shift line is switched from the first type gearshift line to the second type gearshift line. Therefore, it is possible to switch the gear shift line without giving a sense of discomfort to the driver.

In the gear shift line setting routine of FIG. 15, in order to suppress frequent switching (hunting) between the first type gear shift line and the second type gear shift line of the gearshift line, it is possible to prohibit re-switching of the gearshift line until elapse of predetermined time after switching of the gear shift line.

Figure 16:
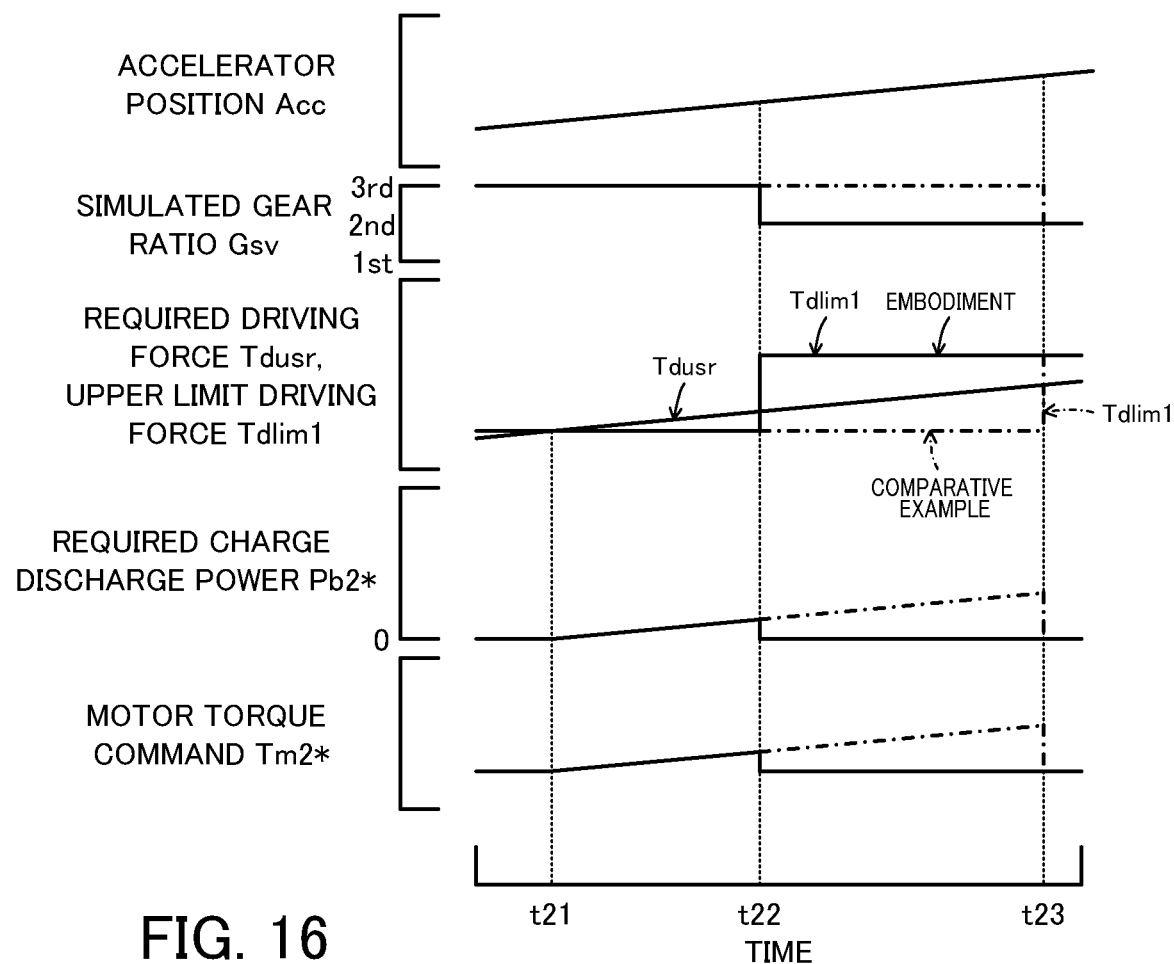
FIG. 16 is a diagram illustrating one example of variations in the accelerator position Acc, a simulated gear ratio Gsv, the required driving force Tdusr, the upper limit driving force Tdlim1, the required charge discharge power Pb2* of the battery, and a torque command Tm2* of the motor MG2 when a state of charge SOC of the battery is equal to or lower than a reference value Sref1 and a power-on downshift that is a downshift of the simulated gear ratio Gsv with an (steep) increase in the accelerator position Acc is performed.

FIG. 16 is a diagram illustrating one example of variations in the accelerator position Acc, a simulated gear ratio Gsv, the required driving force Tdusr, the upper limit driving force Tdlim1, the required charge discharge power Pb2* of the battery 50, and a torque command Tm2* of the motor MG2 when a state of charge SOC of the battery 50 is equal to or lower than a reference value Sref1 and a power-on downshift that is a downshift of the simulated gear ratio Gsv with an (steep) increase in the accelerator position Acc is performed. In FIG. 16, a time range sufficiently short compared with the time range of FIG. 14 (the time range around downshift of the simulated gear ratio Gsv) is laterally enlarged. In FIG. 16, regarding the simulated gear ratio Gsv, the required charge discharge power Pb2* of the battery 50, and the torque command Tm2* of the motor MG2, the solid lines indicate the state of the embodiment, and the broken lines indicate the state of the comparative example. The comparative example is a case where only the first type gear shift line is used as the gear shift line.

In the comparative example, after the required driving force Tdusr becomes equal to or larger than the upper limit driving force Tdlim1 (at a time t21), when the accelerator position Acc straddles the first type gear shift line (at a time t23), the simulated gear ratio Gsv is downshifted. The time for performing the battery power compensation thus becomes longer (for a time period of t21 to t23) compared with the embodiment, and an amount of electric power (total energy) of the battery 50 that is necessary for the battery power compensation becomes larger compared with the embodiment. Further, since the amount of change of the required charge discharge power Pb2* of the battery 50 (amount of change of the torque command Tm2* of the motor MG2) when the simulated gear ratio Gsv is downshifted is large, it is possible to appear in the variation of the driving force output to the drive shaft 36.

In the embodiment, on the other hand, after the required driving force Tdusr becomes equal to or larger than the upper limit driving force Tdlim1 (at the time t21), when the accelerator position Acc straddles the second type gear shift line that is a lower accelerator position side than the first type gear shift line (at a time t22), the simulated gear ratio Gsv is downshifted. The time for performing the battery power compensation thus becomes shorter (for a time period of t21 to t22) compared with the comparative example, and the amount of electric power (total energy) of the battery 50 that is necessary for the battery power compensation becomes smaller compared with the comparative example. This suppresses the decrease of the state of charge SOC of the battery 50. Further, the amount of change of the required charge discharge power Pb2* of the battery 50 when the simulated gear ratio Gsv is downshifted can be small and the variation of the driving force output to the drive shaft 36 can be suppressed.

In the hybrid vehicle 20 of the embodiment described above, the HVECU 70 uses the first type gear shift line as the gear shift line and switches the gear shift line from the first type gear shift line to the second type gear shift line when the predetermined condition including the condition that the state of charge SOC of the battery 50 is equal to or lower than the reference value Sref1 is satisfied. The predetermined condition may include a condition that the state of charge SOC of the battery 50 is equal to or lower than the reference value Sref2 that is smaller than the reference value Sref1. The predetermined condition may further include a condition that the simulated gear ratio Gsv is downshifted when the state of charge SOC is equal to or lower than the reference value Sref1 and the second type gear shift line is used as the gear shift line. The predetermined condition may further include a condition that the simulated gear ratio Gsv is upshifted when the state of charge SOC is equal to or lower than the reference value Sref1, the accelerator position Acc is equal to or smaller than the reference value Aref, and the second type gear shift line is used as the gear shift line. The predetermined condition may further include a condition that the simulated gear ratio Gsv is kept unchanged when the state of charge SOC is equal to or lower than the reference value Sref1 and the first type gear shift line is used as the gear shift line and when the second type gear shift line is used, and the required charge discharge power Pb2* of the battery 50 is equal to or smaller than the reference value Pb2ref. According to the control described above, the hybrid vehicle 20 suppresses the state of charge SOC of the battery 50 from being decreased and also suppresses over discharge of the battery.

In the hybrid vehicle 20 of the embodiment, when the state of charge SOC of the battery 50 is lower than the reference value Slo1, the HVECU 70 sets the compensable power Pcolim to decrease from the predetermined power Pdi2 to the value 0 with decrease in the state of charge SOC and to be kept constant at the value 0. The HVECU 70, however, may set the compensable power Pcolim to decrease from the predetermined power Pdi2 to the value 0 and to be kept constant at the value 0 with elapse of time (increase in the duration) since a time when the state of charge SOC of the battery 50 becomes lower than the reference value Slo1. In this case, after the state of charge SOC of the battery 50 becomes equal to or higher than the reference value Sref1, the compensable power Pcolim may be returned to the predetermined power Pdi2.

In the hybrid vehicle 20 of the embodiment, as the predetermined condition for switching the gear shift line from the first type gear shift line to the second type gear shift line, the HVECU 70 uses the condition that the state of charge SOC of the battery 50 is equal to or lower than the reference value Sref2 that is smaller than the reference value Sref1, the condition that the simulated gear ratio Gsv is downshifted when the state of charge SOC is equal to or lower than the reference value Sref1 and the second type gear shift line is used as the gear shift line, the condition that the simulated gear ratio Gsv is upshifted when the state of charge SOC is equal to or lower than the reference value Sref1, the accelerator position Acc is equal to or smaller than the reference value Aref, and the second type gear shift line is used as the gear shift line, and the condition that the simulated gear ratio Gsv is kept unchanged when the state of charge SOC is equal to or lower than the reference value Sref1 and the first type gear shift line is used as the gear shift line and when the second type gear shift line is used, and the required charge discharge power Pb2* of the battery 50 is equal to or lower than the reference value Pb2ref. The HVECU 70 may, however, use only a part of these predetermined conditions.

In the hybrid vehicle 20 of the embodiment, the HVECU 70 prohibits the battery power compensation when the second type gear shift line is used as the gear shift line. The HVECU 70, however, may not prohibit the battery power compensation even when the second type gear shift line is used as the gear shift line. As described above, when the second type gear shift line is used as the gear shift line, the rotation speed Ne (target rotation speed Ne*) of the engine 22, the upper limit power Pelim and the upper limit driving force Tdlim1 are likely to be larger compared to when the first type gear shift line is used. Accordingly, the hybrid vehicle 20 of the present disclosure suppresses the required driving force Tdusr from being larger than the upper limit driving force Tdlim1 and also suppresses the required compensation power Pcoreq and accordingly the target compensation power Pcotag from being larger when the required driving force Tdusr becomes larger than the upper limit driving force Tdlim1. As a result, the hybrid vehicle 20 accordingly suppresses the decrease of the state of charge SOC of the battery 50 to some extent even the battery power compensation is not prohibited.

In the hybrid vehicle 20 of the embodiment, the HVECU 70 performs the gear shift line setting routine of FIG. 15. Instead, the HVECU 70 may perform the gear shift line setting routine of FIG. 17 as a modification. The gear shift line setting routine of FIG. 17 is similar to the gear shift line setting routine of FIG. 15 except replacement of the processing of step S400 by the processing of S402 and adding of the processing of steps S404 to S406.

Figure 17:
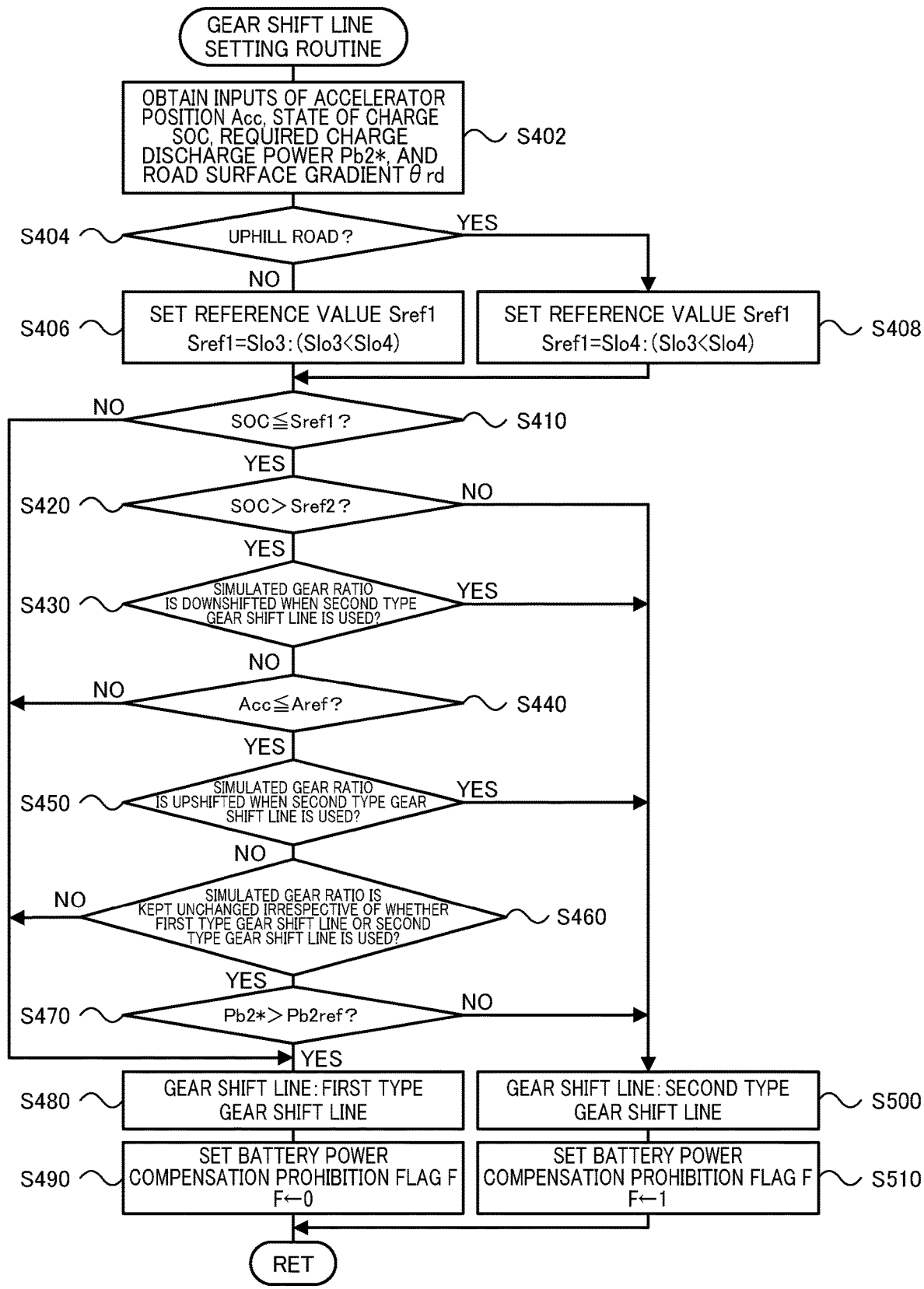
FIG. 17 is a flowchart showing one example of a gear shift line setting routine according to a modification.

In the gear shift line setting routine of FIG. 17 as the modification, the HVECU 70 obtains input data of the road surface gradient θrd from the gradient sensor 89 in addition to the accelerator position Acc, the state of charge SOC and the required charge discharge power Pb2* of the battery 50 (step S402). The HVECU 70 subsequently determines whether the road on which the vehicle is driving is an uphill road based on the road surface gradient θrd (step S404). When the road on which the vehicle is driving is not the uphill road (flat road or downhill road), the reference value Sref1 is set to a predetermined value Slo3 (step S406). On the other hand, when the road on which the vehicle is driving is the uphill road, the reference value Sref1 is set to a predetermined value Slo4 that is larger than the predetermined value Slo3 (step S408). The processing of and after step S410 is then performed.

As the predetermined value Slo3, the same value as or slightly larger value than the above-mentioned reference value Slo1 is used. As the predetermined value Slo4, a slightly larger value than the predetermined value Slo3 is used. Since a running resistance becomes larger in the uphill road than that of a flat road or a downhill road, the increase of depression of the accelerator pedal 83 is thus easily performed by the driver. It is thus possible to increase the reference value Sref1 so that the gear shift line is easily switched from the first type gear shift line to the second type gear shift line as described in this modification.

Figure 18:
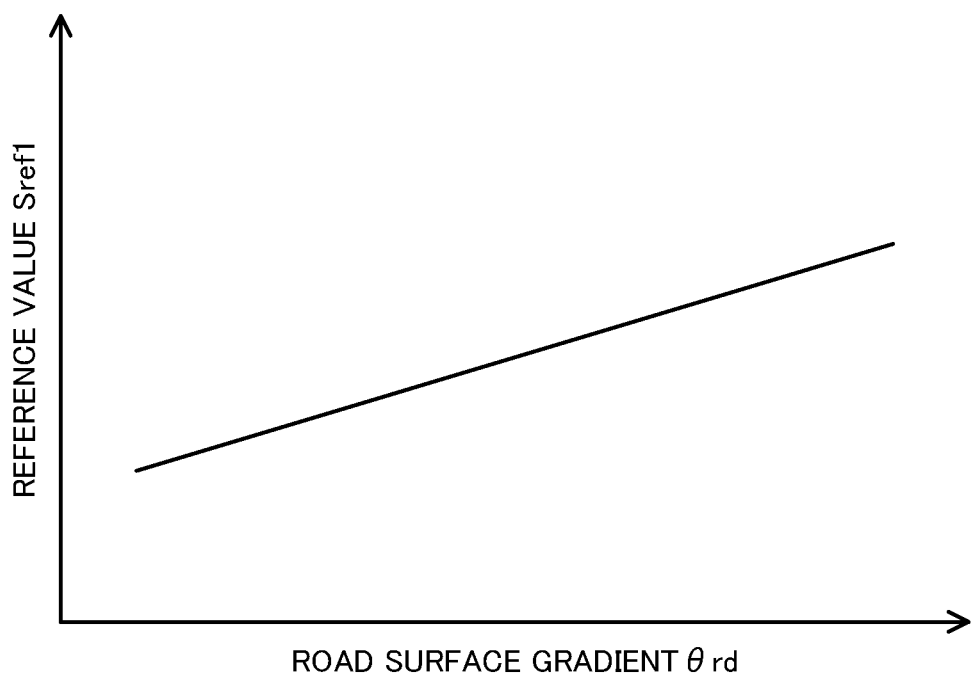
FIG. 18 a diagram illustrating one example of a reference value setting map.

According to this modification, when the road on which the vehicle is driving is not the uphill road (flat road or downhill road), the reference value Sref1 is set to the predetermined value Slo3. On the other hand, when the road on which the vehicle is driving is the uphill road, the reference value Sref1 is set to the predetermined value Slo4 that is larger than the predetermined value Slo3. The HVECU 70 may, however, set the reference value Sref1 by using the road surface gradient θrd and the reference value setting map. The reference value setting map is set in advance to specify a relationship among the road surface gradient θrd and the reference value Sref1 and is stored in the non-illustrated ROM. FIG. 18 a diagram illustrating one example of a reference value setting map. As illustrated, the reference value Sref1 is set to increase with an increase in the road surface gradient θrd toward the uphill road side. The reference value Sref1 can be set more appropriately.

In the hybrid vehicle 20 of the embodiment, the HVECU 70 processes the target compensation power Pcotag of the battery 50 by the rating process using the rating value α based on the required compensation power Pcoreq of the battery 50 to calculate the required charge discharge power Pb2* of the battery 50. The rating value α is, however, not limited to the value of this embodiment but may be a value based on a change of the simulated gear ratio Gsv before and after the upshift or may be a fixed value.

In the hybrid vehicle 20 of the embodiment, the HVECU 70 processes the target compensation power Pcotag of the battery 50 by the rating process using the rating value α to calculate the required charge discharge power Pb2* of the battery 50. According to a modification, the HVECU 70 may process the target compensation power Pcotag of the battery 50 by a smoothing process using a time constant τ to calculate the required charge discharge power Pb2* of the battery 50. The time constant τ used here may be a value based on the required compensation power Pcoreq of the battery 50. The time constant τ used may be a value based on a change of the simulated gear ratio Gsv before and after the upshift. The time constant τ used may be a fixed value.

The hybrid vehicle 20 of the embodiment is provided with the mode switch 90. The HVECU 70 performs the drivability priority control routine of FIGS. 5 and 6 and the gear shift line setting routine of FIG. 15 when the hybrid vehicle 20 is driven by HV drive at the shift position SP set to the D position with selection of the drivability priority mode as the working drive mode by the driver's operation of the mode switch 90. According to a modification, the hybrid vehicle 20 may not be provided with the mode switch 90. The HVECU 70 may perform the drivability priority control routine of FIGS. 5 and 6 and the gear shift line setting routine of FIG. 15 when the hybrid vehicle 20 is driven by HV drive at the shift position SP set to the D position in the ordinary mode.

In the hybrid vehicle 20 of the embodiment, the ten-speed simulated transmission is configured such that two virtual gear ratios are provided with regard to each of the gear ratios of the first to the third speeds of the four-speed stepped transmission 60. The number of speeds of the stepped transmission 60 is, however, not limited to the four speeds but may be two speeds or three speeds or may be five or more speeds. According to a modification, a desired number of gear ratios, for example, one gear ratio or two gear ratios may be provided with regard to at least one of the gear ratios of the respective speeds of the stepped transmission 60. In this modification, a different desired number of gear ratios may be provided with regard to each of the gear ratios of the respective speeds of the stepped transmission 60. A hybrid vehicle of another modification may not be provided with any virtual gear ratios.

The hybrid vehicle 20 of the embodiment is provided with the stepped transmission 60. A hybrid vehicle of a modification may not be provided with the stepped transmission 60 but may be configured such that the driveshaft 36 is directly connected with the transmission member 32 that is connected with the ring gear 30r of the planetary gear 30. In this modification, the simulated transmission may be a ten-speed transmission, may be a nine- or a less number of speed-transmission, or may be an eleven- or a greater number of speed-transmission.

In the hybrid vehicle 20 of the embodiment, the motor MG2 is directly connected with the input shaft 61 of the stepped transmission 60. According to a modification, the motor MG2 may be connected with the input shaft 61 of the stepped transmission 60 via a speed reducer or the like. According to another modification, the motor MG2 may be directly connected with the output shaft 62 of the stepped transmission 60. According to another modification, the motor MG2 may be connected with the output shaft 62 of the stepped transmission 60 via a speed reducer or the like.

The hybrid vehicle 20 of the embodiment uses the battery 50 as the power storage device. According to a modification, a capacitor may be used as the power storage device.

The hybrid vehicle 20 of the embodiment is provided with the engine ECU 24, the motor ECU 40, the battery ECU 52 and the HVECU 70. At least two of these ECUs may be configured as a single electronic control unit.

In the hybrid vehicle of the present disclosure, the predetermined condition may include a condition that the state of charge is equal to or lower than the first ratio and that the gear ratio is downshifted when the gear shift line is changed from the first type gear shift line to the second type gear shift line. Further, the predetermined condition may include a condition that the state of charge is equal to or lower than the first ratio, that the operation amount of the accelerator is equal to or less than a predetermined operation amount, and that the gear ratio is upshifted when the gear shift line is changed from the first type gear shift line to the second type gear shift line. Furthermore, the predetermined condition may include a condition that the state of charge is equal to or lower than the first ratio, that the gear ratio is kept unchanged irrespective of whether the first type gear shift line or the second type gear shift line is used as the gear shift line, and that the target compensation power is equal to or smaller than a predetermined power. In addition, the predetermined condition may include a condition that the state of charge is equal to or lower than a second ratio, which is smaller than the first ratio. This hybrid vehicle can switch the gear shift line from the first type gear shift line to the second type gear shift line at more appropriate timing.

In the hybrid vehicle of the present disclosure, the first ratio may be set such as to provide a larger value in an uphill road than a value in a road other than the uphill road. The operation amount of the accelerator is likely to be greater in the uphill road than the amount in the road other than the uphill road. It is thus possible to set the larger first ratio so that the predetermined condition is easily satisfied.

In the hybrid vehicle of the present disclosure, the control device may be programmed to set a required compensation power of the power storage device such as to increase with an increase in the difference between the required driving force and the first upper limit driving force. The control device may be programmed to set an available compensation power such as to decrease with a decrease in the state of charge when the state of charge is equal to or lower than a third ratio that is equal to or smaller than the first ratio or such as to decrease with elapse of time since a time when the state of charge becomes equal to or lower than the third ratio. The control device may be programmed to set the target compensation power by limiting the required compensation power with the available compensation power.

In the hybrid vehicle of the present disclosure, when the second type gear shift line is used as the gear shift line, the control device may be programmed to set the target driving force to the smaller between the required driving force and the first upper limit driving force. Accordingly, the power storage device power compensation is not performed when the required driving force becomes larger than the first upper limit driving force. In this hybrid vehicle, the decrease of the state of charge SOC of the power storage device is further suppressed.

In the hybrid vehicle of the present disclosure, when the first upper limit driving force is to be set, the control device may be programmed to set the first upper limit driving force to a driving force in such a state that a total power of the upper limit power and a first required charge discharge power of the power storage device, which is based on the state of charge of the power storage device and which has a positive value in a discharging state, is output to the driveshaft, and when the second upper limit driving force is to be set, the control device may be programmed to set the second upper limit driving force to a driving force in such a state that a total power of the upper limit power, the first required charge discharge power, and a second required charge discharge power of the power storage device, which is based on the target compensation power and which has a positive value in the discharging state, is output to the drive shaft. In this hybrid vehicle, the first upper limit driving force and the second upper limit driving force can be set more appropriately.

In this case, when the required driving force is equal to or smaller than the first upper limit driving force, the control device may be programmed to set a target power of the engine to a power calculated by subtracting the first required charge discharge power from a power required to output the target driving force to the driveshaft. When the required driving force is larger than the first upper limit driving force, the control device may be programmed to set the target power of the engine to a power calculated by subtracting a sum of the first required charge discharge power and the second required charge discharge power from the power required to output the target driving force to the driveshaft. The control device may be programmed to control the engine, such that the target power is output from the engine.

In the hybrid vehicle of the present disclosure, the gear ratio may be a virtual gear ratio. The hybrid vehicle may further include a stepped transmission placed between the planetary gear and the driveshaft, and the gear ratio may be a gear ratio of the stepped transmission or a gear ratio determined from the gear ratio of the stepped transmission by taking into account a virtual gear ratio. The "gear ratio determined from the gear ratio of the stepped transmission by taking into account the virtual gear ratio" means a gear ratio determined by combining the gear ratio of the stepped transmission with the virtual gear ratio. For example, setting one virtual gear ratio with regard to each gear ratio of a two-speed stepped transmission provides a total of four gear ratios. In another example, setting two virtual gear ratios with regard to each of respective gear ratios of a first speed to a third speed of a four-speed stepped transmission provides a total of ten gear ratios. The hybrid vehicle of this configuration provides a desired number of gear ratios.

The following describes the correspondence relationship between the primary elements of the above embodiment and the primary elements of the disclosure described in Summary. In the embodiment, the engine 22 corresponds to the "engine", the motor MG1 corresponds to the "first motor", the planetary gear 30 corresponds to the "planetary gear", and the motor MG2 corresponds to the "second motor", the battery 50 corresponds to the "power storage device" the engine ECU 24, the motor ECU 40 and the HVECU 70 correspond to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is applicable to the manufacturing industries of the hybrid vehicle and so on.

The invention claimed is:

1. A hybrid vehicle, comprising an engine; a first motor; a planetary gear including three rotational elements that are respectively connected with the engine, the first motor and a driveshaft which is linked with an axle; a second motor configured to input and output power from and to the driveshaft; a power storage device configured to transmit electric power to and from the first motor and the second motor; and a control device, wherein
the control device is programmed to:
set a required driving force that is required for the driveshaft, based on an operation amount of an accelerator and a vehicle speed;
set a gear ratio, based on the operation amount of the accelerator and the vehicle speed;
set a target rotation speed of the engine, based on the vehicle speed and the gear ratio;
set an upper limit power of the engine when the engine is driven at the target rotation speed;
set a first upper limit driving force of the driveshaft when the upper limit power is output from the engine;
set a target driving force of the driveshaft, based on a magnitude relationship between the required driving force and the first upper limit driving force; and
control the engine, the first motor and the second motor, such that the engine is driven at the target rotation speed and that the hybrid vehicle is driven with the target driving force, wherein
when the required driving force is equal to or smaller than the first upper limit driving force,
the control device is programmed to set the target driving force to the required driving force, and
when the required driving force is larger than the first upper limit driving force,
the control device is programmed to set a target compensation power of the power storage device, based on a difference between the required driving force and the first upper limit driving force,
the control device is programmed to set a second upper limit driving force of the driveshaft when the upper limit power is output from the engine and power storage device power compensation is performed to charge or discharge the power storage device based on a power corresponding to the target compensation power, and
the control device is programmed to set the target driving force to the smaller between the required driving force and the second upper limit driving force, and wherein
when a first type gear shift line is used as a gear shift line to change the gear ratio, and a predetermined condition including a condition that a state of charge of the power storage device is equal to or lower than a first ratio is satisfied,
the control device is programmed to change the gear shift line to a second type gear shift line that recommends a lower speed gear ratio than the first type gear shift line.

2. The hybrid vehicle according to claim 1,
wherein the predetermined condition includes a condition that the state of charge is equal to or lower than the first ratio and that the gear ratio is downshifted when the gear shift line is changed from the first type gear shift line to the second type gear shift line.

3. The hybrid vehicle according to claim 1,
wherein the predetermined condition includes a condition that the state of charge is equal to or lower than the first ratio, that the operation amount of the accelerator is equal to or less than a predetermined operation amount, and that the gear ratio is upshifted when the gear shift line is changed from the first type gear shift line to the second type gear shift line.

4. The hybrid vehicle according to claim 1,
wherein the predetermined condition includes a condition that the state of charge is equal to or lower than the first ratio, that the gear ratio is kept unchanged irrespective of whether the first type gear shift line or the second type gear shift line is used as the gear shift line, and that the target compensation power is equal to or smaller than a predetermined power.

5. The hybrid vehicle according to claim 1,
wherein the predetermined condition includes a condition that the state of charge is equal to or lower than a second ratio, which is smaller than the first ratio.

6. The hybrid vehicle according to claim 1,
wherein the first ratio is set such as to provide a larger value in an uphill road than a value in a road other than the uphill road.

7. The hybrid vehicle according to claim 1,
wherein the control device is programmed to set a required compensation power of the power storage device such as to increase with an increase in the difference between the required driving force and the first upper limit driving force,
the control device is programmed to set an available compensation power such as to decrease with a decrease in the state of charge when the state of charge is equal to or lower than a third ratio that is equal to or smaller than the first ratio or such as to decrease with elapse of time since a time when the state of charge becomes equal to or lower than the third ratio, and
the control device is programmed to set the target compensation power by limiting the required compensation power with the available compensation power.

8. The hybrid vehicle according to claim 1,
wherein when the second type gear shift line is used as the gear shift line, the control device is programmed to set the target driving force to the smaller between the required driving force and the first upper limit driving force.

9. The hybrid vehicle according to claim 1,
wherein when the first upper limit driving force is to be set, the control device is programmed to set the first upper limit driving force to a driving force in such a state that a total power of the upper limit power and a first required charge discharge power of the power storage device, which is based on the state of charge of the power storage device and which has a positive value in a discharging state, is output to the driveshaft, and
when the second upper limit driving force is to be set, the control device is programmed to set the second upper limit driving force to a driving force in such a state that a total power of the upper limit power, the first required charge discharge power, and a second required charge discharge power of the power storage device, which is based on the target compensation power and which has a positive value in the discharging state, is output to the drive shaft.

10. The hybrid vehicle according to claim 9,
wherein when the required driving force is equal to or smaller than the first upper limit driving force,
the control device is programmed to set a target power of the engine to a power calculated by subtracting the first required charge discharge power from a power required to output the target driving force to the driveshaft, and
when the required driving force is larger than the first upper limit driving force,
the control device is programmed to set the target power of the engine to a power calculated by subtracting a sum of the first required charge discharge power and the second required charge discharge power from the power required to output the target driving force to the driveshaft, and wherein
the control device is programmed to control the engine, such that the target power is output from the engine.

11. The hybrid vehicle according to claim 1,
wherein the gear ratio is a virtual gear ratio.

12. The hybrid vehicle according to claim 1, further comprising:
a stepped transmission placed between the planetary gear and the driveshaft, wherein
the gear ratio is a gear ratio of the stepped transmission or a gear ratio determined from the gear ratio of the stepped transmission by taking into account a virtual gear ratio.

* * * * *